United States Patent
Baruco et al.

(10) Patent No.: US 8,098,130 B2
(45) Date of Patent: Jan. 17, 2012

(54) SYSTEM AND METHOD FOR ACTIVATING ELECTROMECHANICAL SYSTEMS USING FLEXIBLE INTELLIGENT RADIO FREQUENCY MODULES

(75) Inventors: Samuel R. Baruco, Aurora (CA); Yaroslaw Matkiwsky, Whitby (CA); Victor Rabinovich, Richmond Hill (CA); Reginald C. Grills, Oshawa (CA); Thomas M. Bednarchuk, Zephyr (CA)

(73) Assignee: Flextronics Automotive Inc., Ontario (CA)

( * ) Notice: Subject to any disclaimer, the term of this patent is extended or adjusted under 35 U.S.C. 154(b) by 884 days.

(21) Appl. No.: 12/155,880

(22) Filed: Jun. 11, 2008

(65) Prior Publication Data

US 2009/0309714 A1 Dec. 17, 2009

(51) Int. Cl.
G05B 19/00 (2006.01)
G05B 23/00 (2006.01)
G06K 19/00 (2006.01)
B60R 25/00 (2006.01)

(52) U.S. Cl. ............... 340/5.72; 340/5.61; 340/5.64; 340/5.7; 340/5.84; 340/426.36

(58) Field of Classification Search ............ 340/426.36, 340/5.61, 5.64, 5.7, 5.72, 5.84
See application file for complete search history.

(56) References Cited

U.S. PATENT DOCUMENTS

| | | | | |
|---|---|---|---|---|
| 4,856,072 A * | 8/1989 | Schneider et al. | ............. | 381/86 |
| 5,704,008 A * | 12/1997 | Duvall, Jr. | ............. | 704/273 |
| 5,812,067 A * | 9/1998 | Bergholz et al. | ............. | 340/5.52 |
| 6,034,617 A * | 3/2000 | Luebke et al. | ............. | 340/5.62 |
| 6,075,454 A * | 6/2000 | Yamasaki | ............. | 340/5.61 |
| 6,140,939 A * | 10/2000 | Flick | ............. | 340/12.28 |
| 6,148,202 A * | 11/2000 | Wortham | ............. | 455/434 |
| 6,208,239 B1 * | 3/2001 | Muller et al. | ............. | 340/426.35 |
| 6,420,797 B1 * | 7/2002 | Steele et al. | ............. | 307/9.1 |
| 6,552,649 B1 * | 4/2003 | Okada et al. | ............. | 340/5.61 |
| 7,061,368 B2 * | 6/2006 | Okada | ............. | 340/5.6 |
| 2001/0028296 A1 * | 10/2001 | Masudaya | ............. | 340/5.61 |
| 2002/0017978 A1 * | 2/2002 | Kanda et al. | ............. | 340/5.61 |
| 2002/0126054 A1 * | 9/2002 | Fuerst et al. | ............. | 343/712 |
| 2003/0107473 A1 * | 6/2003 | Pang et al. | ............. | 340/5.72 |
| 2003/0216817 A1 * | 11/2003 | Pudney | ............. | 700/17 |
| 2005/0143884 A1 * | 6/2005 | Bihler et al. | ............. | 701/36 |
| 2005/0275505 A1 * | 12/2005 | Himmelstein | ............. | 340/5.8 |
| 2006/0278700 A1 * | 12/2006 | Gotfried et al. | ............. | 235/382 |
| 2007/0021157 A1 | 1/2007 | Chen et al. | | |
| 2007/0040649 A1 * | 2/2007 | Dulgerian et al. | ............. | 340/5.64 |

FOREIGN PATENT DOCUMENTS

WO    WO 2004/059402    7/2004

* cited by examiner

*Primary Examiner* — Jennifer Mehmood
*Assistant Examiner* — Andrew Bee
(74) *Attorney, Agent, or Firm* — Patton Boggs LLP

(57) ABSTRACT

A system for activating electromechanical systems of a vehicle, including at least one first flexible intelligent radio frequency module mounted on the vehicle, for receiving wireless communications signals; at least one second flexible intelligent radio frequency module mounted on the vehicle, for receiving wireless communications signals from a transponder, at least one third flexible intelligent radio frequency module mounted on the vehicle, for transmitting a signal when its capacitance is changed when an object is proximal to the at least one third flexible intelligent radio frequency module; at least one fourth flexible intelligent radio frequency module mounted on the vehicle, for receiving sounds external to the vehicle; and a vehicle bus in communication with the at least one first, second, third, and fourth flexible intelligent radio frequency modules.

32 Claims, 21 Drawing Sheets

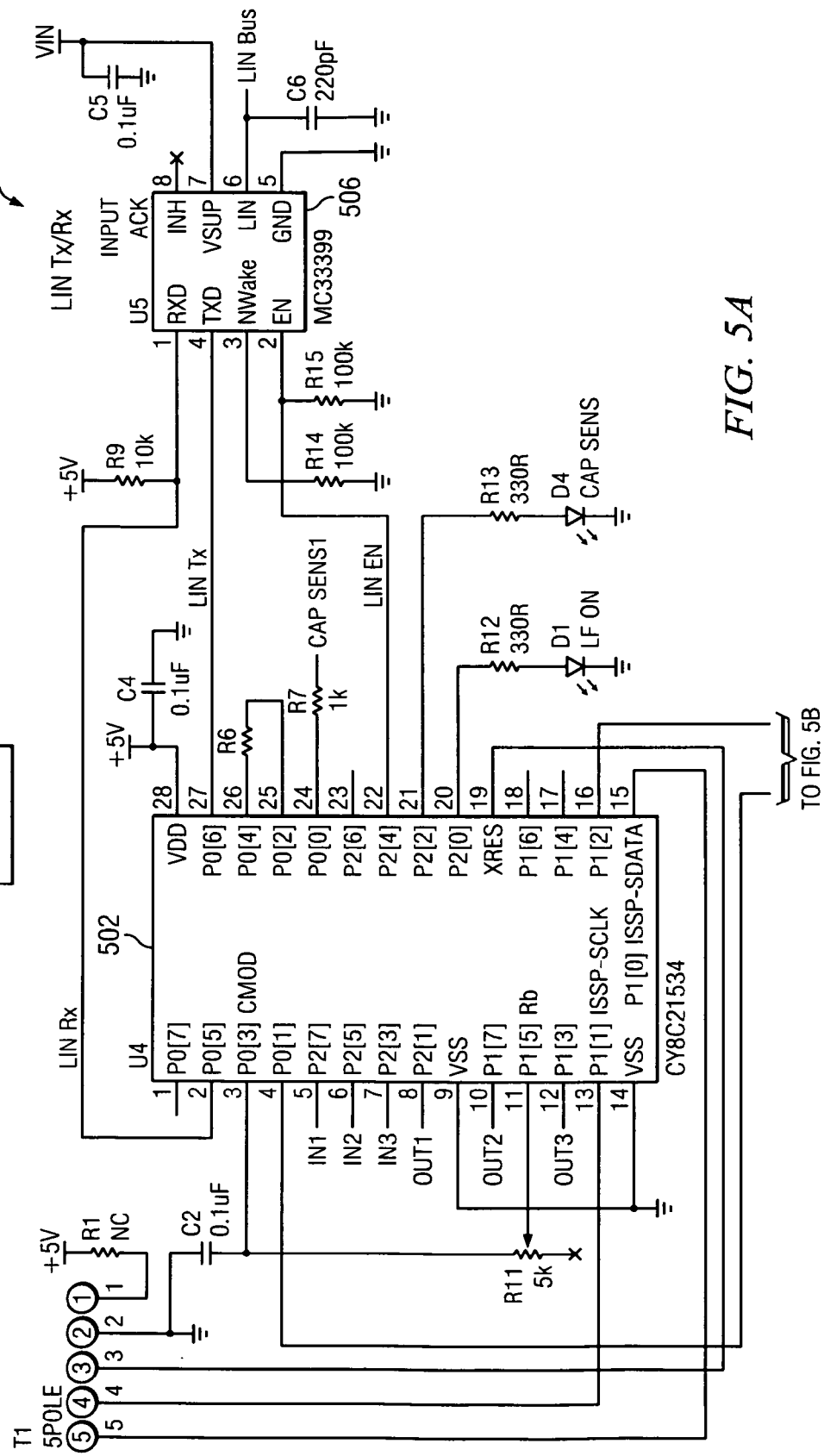

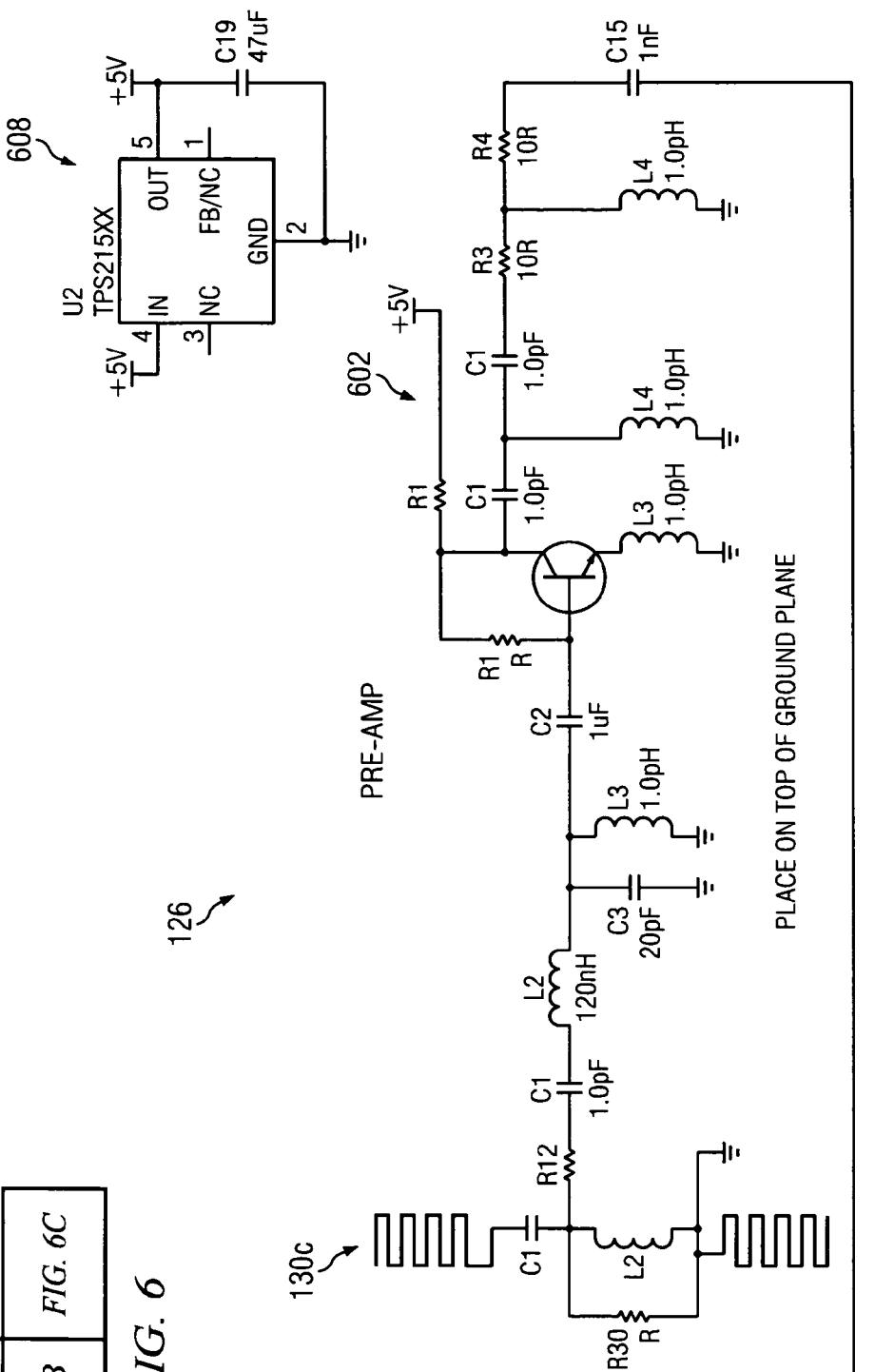

SYSTEM AND METHOD FOR ACTIVATING ELECTROMECHANICAL SYSTEMS USING FLEXIBLE INTELLIGENT RADIO FREQUENCY MODULES

BACKGROUND

Designers of vehicles have embraced technology in recent years. Some of the technologies that have been incorporated into vehicles include electromechanical systems, such as automatic liftgates and sliding doors, remote control transponder/keyfobs, airbags, wireless remote starters, voice activated telephones and sound systems, and so forth. Many of these technologies improve safety, while others improve convenience for users. In many cases, consumers of vehicles are much or more concerned about technology included in each vehicle than performance of the actual vehicle.

Different systems exist to manage these different technologies. For example, some existing system architectures use antennas that are located away from the wireless control module ("WCM"), or other control modules, and are connected through a radio frequency ("RF") cable. These data transmission cables and their connectors are expensive, and the increased length of the cables adds noise to the signal, interfering with the data transmitted between the receiver and the WCM.

In situations where more than one antenna is needed, there are additional RF cables required, and the WCM must use a RF switch to multiplex the different antennas.

SUMMARY

The above-described problems are solved and a technical advance achieved by the system and method for activating electromechanical systems using flexible intelligent radio frequency modules ("system using system using flexible intelligent RF modules") disclosed in this application. The novel system using flexible intelligent RF modules uses a network of flexible intelligent RF modules that replaces the WCM with a group of modules each handling their own responsibilities and functionalities. Similarly, the system using flexible intelligent RF modules may include an antenna, amplifier, and receiver in a small module that may be mounted according the antenna's mounting requirements, and through use of the local interconnect network ("LIN") communications network reduce the need for the specialized connectors or transmission cables. Since the receiver is located in close proximity to the antenna there is very little noise generated between antennas and receivers. The present system using flexible intelligent RF modules may also provide for a LIN antenna to boost a wider range than its conventional equivalent.

The present system using flexible intelligent RF modules integrates various applications, such as passive entry/activation, voice activation, and hands-free technology (capacitive sensors) into a single control module. The present system using flexible intelligent RF modules provides for diverse functionality, placement, and operation unique in automotive applications, for example.

To further improve conveniences of vehicles, the principles of the present system using flexible intelligent RF modules incorporates wireless communications and voice communications external to a vehicle to activate electromechanical systems of the vehicle. By using both wireless communications, such as passive, active, and/or semi-passive transponder/keyfobs and voice recognition systems, safety and security is provided by preventing unauthorized or undesired activation of the electromechanical systems.

The present system using flexible intelligent RF modules may use any number of control modules throughout a vehicle. The system using flexible intelligent RF modules reduces the wiring harness complexity of existing systems by utilizing the LIN bus network already in place on a vehicle and eliminating the need for special cables and connectors between the antenna and a WCM. Each control module may contain multiple functions and be networked together with other control modules to share functions and responsibilities. In addition, the control modules of the present system using flexible intelligent RF modules may perform different functions located throughout a vehicle.

In one embodiment, the present system for activating electromechanical systems of a vehicle, includes at least one first flexible intelligent radio frequency module mounted on the vehicle, for receiving wireless communications signals; at least one second flexible intelligent radio frequency module mounted on the vehicle, for receiving wireless communications signals from a transponder, at least one third flexible intelligent radio frequency module mounted on the vehicle, for transmitting a signal when its capacitance is changed when an object is proximal to the at least one third flexible intelligent radio frequency module; at least one fourth flexible intelligent radio frequency module mounted on the vehicle, for receiving sounds external to the vehicle; and a vehicle bus in communication with the at least one first, second, third, and fourth flexible intelligent radio frequency modules.

In another embodiment, the present invention includes a method for activating electromechanical systems of a vehicle, including determining that a first flexible intelligent radio frequency module has received a message from a second flexible intelligent radio frequency module via a vehicle bus; determining that a transponder/keyfob has entered a radio frequency field at one or more of the first and second flexible intelligent radio frequency modules; responsive to one of determining that a first flexible intelligent radio frequency module has received a message and determining that a transponder/keyfob has entered a radio frequency field, activating a capacitive sensing system; and responsive to determining that a user is locally external to a capacitive sensor of the capacitive sensing system, transmitting a command message on the vehicle bus to activate an electromechanical system of the vehicle.

In yet another embodiment, the present invention includes a method for activating electromechanical systems of a vehicle, including determining that a first flexible intelligent radio frequency module has received a message from a second flexible intelligent radio frequency module via a vehicle bus; responsive to determining that a first flexible intelligent radio frequency module has received a message, activating a capacitive sensing system; and responsive to determining that a user is locally external to a capacitive sensor of the capacitive sensing system, transmitting a command message on the vehicle bus to activate an electromechanical system of the vehicle.

In yet still another embodiment, the present invention includes a vehicle, including a vehicle body, at least one first flexible intelligent radio frequency module mounted on the vehicle, for receiving wireless communications signals; at least one second flexible intelligent radio frequency module mounted on the vehicle, for receiving wireless communications signals from a transponder, at least one third flexible intelligent radio frequency module mounted on the vehicle, for transmitting a signal when its capacitance is changed when an object is proximal to the at least one third flexible intelligent radio frequency module; at least one fourth flexible intelligent radio frequency module mounted on the vehicle, for receiving sounds external to the vehicle; and a vehicle bus in communication with the at least one first, second, third, and fourth flexible intelligent radio frequency modules.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
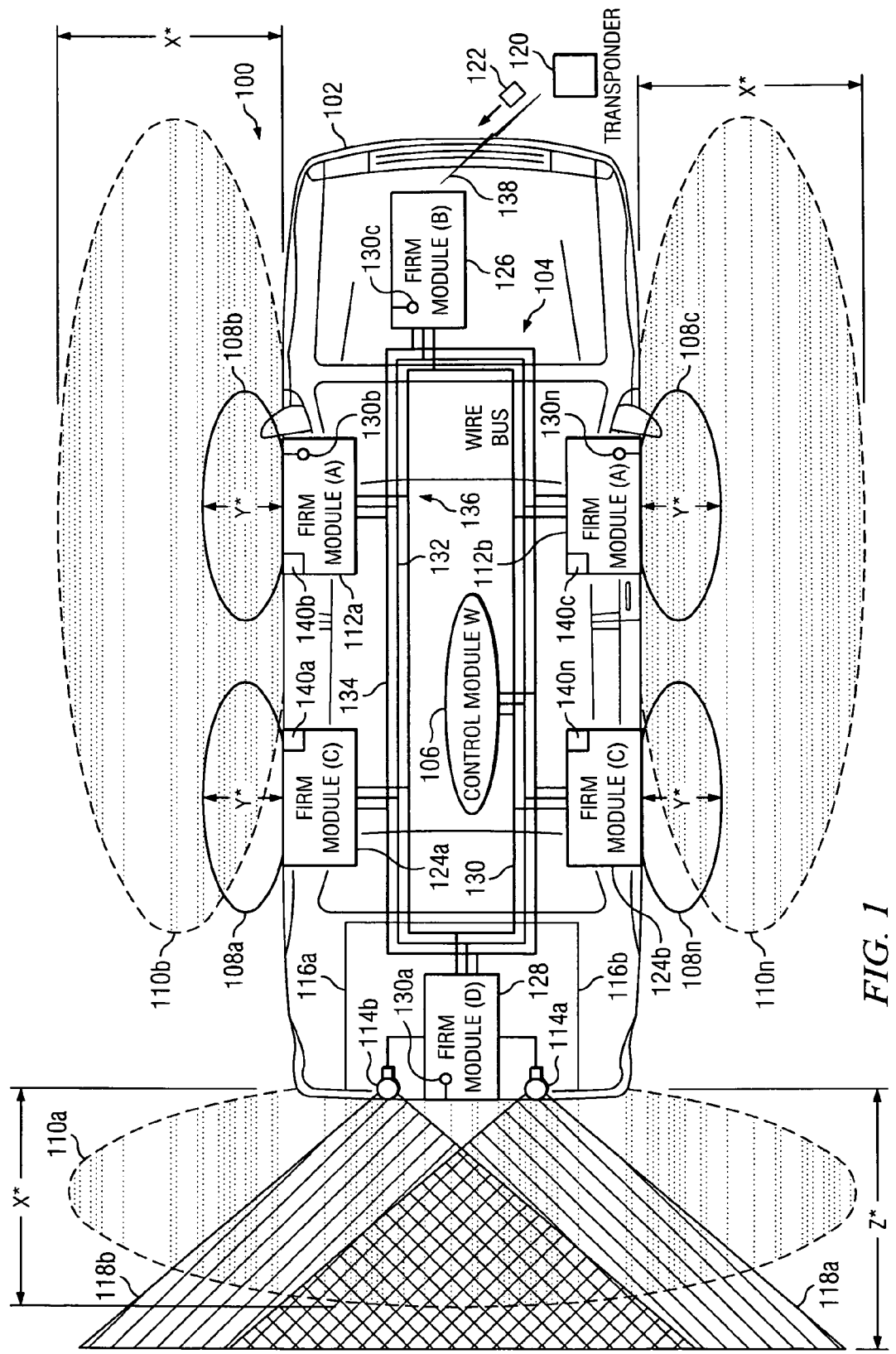
FIG. 1 is an illustration of an exemplary vehicle that enables a user to activate electromechanical systems and subsystems using the system using flexible intelligent RF modules according to an embodiment of the present invention.

FIG. 1 is an illustration of an exemplary vehicle 100 that enables a user to activate, external to the vehicle 100, electromechanical systems using the system using flexible intelligent RF modules 104. The vehicle 100 includes a vehicle body 102 that defines the vehicle 100. For the purposes of this description, the vehicle body 102 may include any structure or component of the vehicle 100, including roof, sidewalls, doors, windows, bumpers, seats, mirrors, and any other physical feature of the vehicle 100.

The system using flexible intelligent RF modules 104 may include any number of flexible intelligent RF modules ("FIRM modules"), such as FIRM modules 112a-112b (collectively 112), 124a-124b (collectively 124), 126, and 128. The system using flexible intelligent RF modules 104 may include a control module 106 that is representative of additional control modules that may be located in the vehicle 100. Any number of FIRM modules 112, 124, 126, and 128 and control module 106 may be located anywhere in or on the vehicle 100. These modules may be connected together by a vehicle bus 136, which may include two power lines 130 and 132 and a communications line 134. Any number of lines may be used for the vehicle bus 136. FIG. 1 shows the vehicle 100 with four different types of FIRM modules 112, 124, 126, and 128, each located in different locations within the vehicle 100, with different functions and implemented technologies.

FIRM modules 112, 126, and 128 may transmit and receive RF frequency signals and they may be configured as a single unit or multiple units. The FIRM modules 112, 126, and 128 may include or be in communication with one or more RF antennas 130a-130n (collectively 130) and may be configured to transmit and receive wireless communications signals, such as RF signals 110a-110n (collectively 110), from the vehicle 100. In one embodiment, the RF signals 110 may be any frequency, such as low frequency ("LF") RF signals and ultrahigh frequency ("UHF") RF signals, for example. In one embodiment, the FIRM modules 112 and 128 may operate with LF RF signals. The LF RF signals may range between approximately 30 kHz and 300 kHz, and more preferably between approximately 18 kHz and 150 kHz, for example. In another embodiment, the FIRM module 126 may operate with UHF RF signals. The UHF RF signals may range between approximately 300 MHz and 3,000 MHz, for example.

The RF antennas 130 may be dipole, conic, or other shaped antennas. The RF antennas 130 may each be the same or different shape to generate the same or different shaped antenna patterns 110a-110n (collectively 110), respectively. The antenna patterns 110 may be directional or omni-directional. In one aspect, the communication paths between the FIRM modules 112, 124, 126, and 128 and the vehicle bus 136 may be wired or wireless connections. Additionally, a wireless communication path may use Bluetooth or any other communication protocol. A hardwired communication path may use a conventional vehicular bus architecture, such as CAN, LIN, or J1850. Alternatively, a non-standard vehicular bus architecture may be utilized.

In addition, the system using flexible intelligent RF modules 104 may be in communication with FIRM module 128 via the vehicle bus 136. The FIRM module 128 may be in communication with one or more microphones 114a-114n (collectively 114) configured to receive sounds locally external to the vehicle. In one embodiment, at least one other microphone (not shown) may be positioned with the vehicle to provide added convenience to users to control electromechanical systems of the vehicle. The microphones 114 may be configured to operate over a frequency range that includes speech or voice frequencies, as understood in the art. The microphones 114 may be in communication with other FIRM modules 112, 124, and 126 and control module 106 via vehicle bus 136. Alternatively, a different bus and/or communications protocol may be utilized for the microphones 114. Each of the microphones 114 may be the same or different and operate to have the same or different coverage patterns 118-118n (collectively 118), respectively.

The RF antennas 130 may be coupled to the vehicle body in any manner and be positioned to have antenna patterns 110 that partially or completely surround the vehicle 100. The system using flexible intelligent RF modules 104 may configure a gain to cause the antenna patterns 110 to be constant or variable based on manufacturer and/or user settings. Similarly, the system using flexible intelligent RF modules 104 may configure a gain for the coverage patterns 118 to be constant or vary. It should be understood that the number of antennas 130 and microphones 114 may be the same or different and vary depending on the size, model, type, or any other difference between vehicles produced by one or more vehicle manufacturers. It should further be understood that the vehicle 100 may be any consumer, commercial, or military motor, rail, aircraft, or watercraft vehicle.

As further shown in FIG. 1, a transponder/keyfob 120 may be used to communicate with the FIRM module 126 via the RF antenna 130c. In one embodiment, the transponder/keyfob 120 is a passive transponder/keyfob (e.g., radio frequency identification ("RFID") tag) that responds to receiving one of the RF signals 138 that operate as a detection signal from the system using flexible intelligent RF modules 104 when in a local range of the vehicle 100. The transponder/keyfob 120 may generate and communicate at least one authorization code(s) 122 that identifies the transponder/keyfob 120 as being associated with the system using flexible intelligent RF modules 104, vehicle 100, and/or FIRM module 126. Alternatively, the transponder/keyfob 120 may be an active device that enables active RF communication with the system using flexible intelligent RF modules 104. Generally, an active transponder/keyfob 120 may include a power source for powering an integrated circuit contained within the transponder/keyfob 120 and transmitting a signal back to the FIRM module 126. The desired distance of operation of the transponder/keyfob 120 to the FIRM module 126 may be relevant in determining whether to use a passive or active transponder/keyfob 120, as known to those skilled in the art. In addition, semi-passive transponder/keyfob 120 may be used to power a microchip, but not the return signal to the FIRM module 126.

The FIRM modules 124, 126, and 128, RF antennas 130, and microphones 114 may be designed and configured to cause the antenna patterns 110 and coverage patterns 118 to overlap and cover the same or similar areas. By covering the same or similar areas, a user who enters an antenna pattern 110a will know that the microphone 114b with the respective coverage pattern 118b will receive his or her voice command. By the antenna patterns 110 and coverage patterns 118 having the same or similar areas, a determination that a user is located external to the vehicle 100 can be made when the transponder/keyfob 120 is within an antenna pattern 110 and, more definitively, when a voice command is received from the user.

Additionally, the FIRM modules 112 and 124 may include capacitive sensors 140a-140n (collectively 140) that may include a probe (not shown), which uses changes in capacitance to sense in distance to a target. The capacitive sensors 140 may further include driver electronics to convert these changes in capacitance into voltage changes and a device to indicate and/or record the resulting voltage change. The capacitive sensors 140 detect and/or sense within a field range 108a-108n (collectively 108) the proximity of a user to a particular capacitive sensor 140, such as to the front or rear doors of the vehicle 100.

Figure 2:
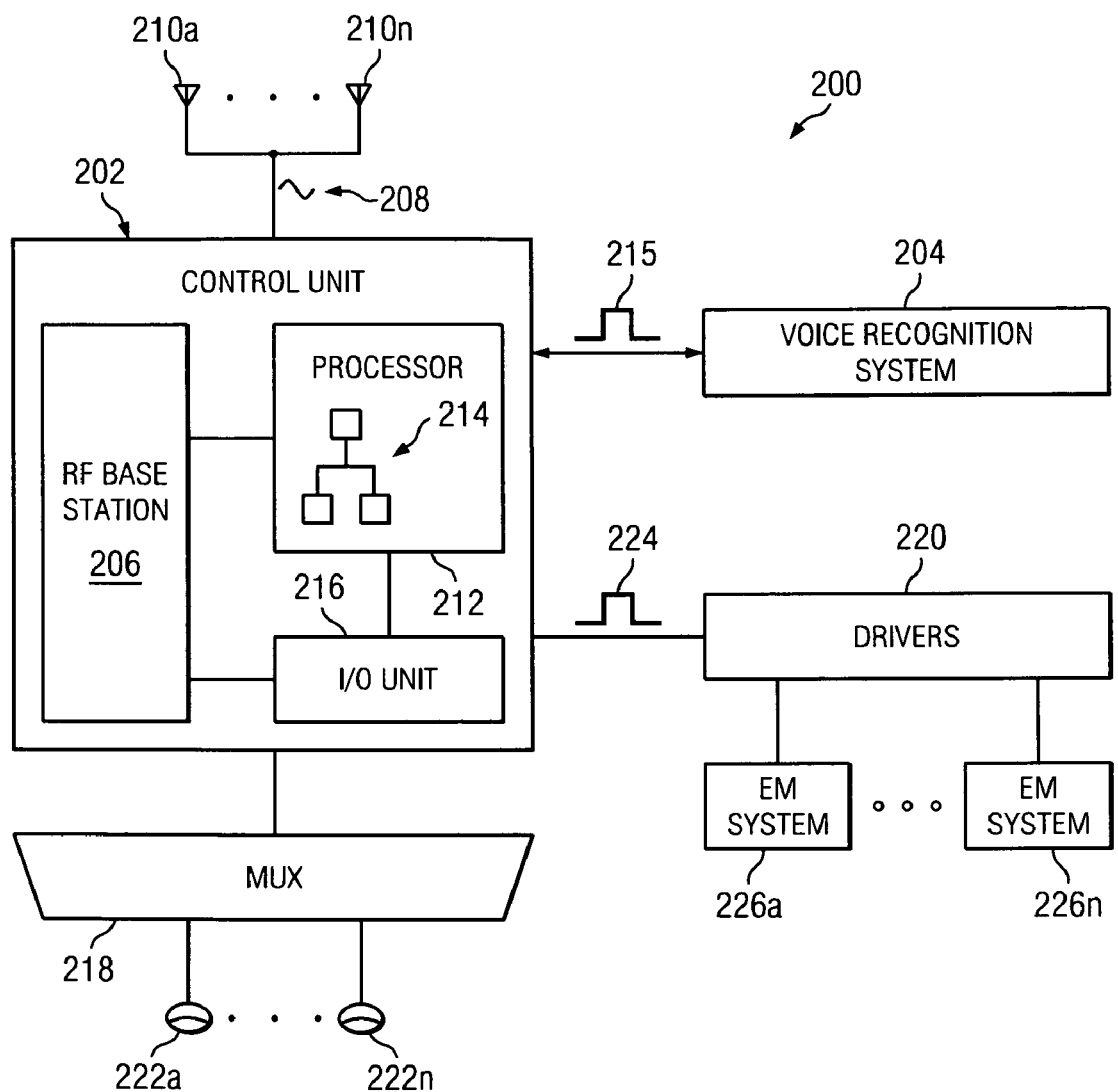
FIG. 2 is a block diagram of an exemplary electrical system that enables a user to control electromechanical systems when the user is located external from a vehicle according to an embodiment of the present invention.

FIG. 2 is a block diagram of an exemplary electrical system 200 that enables a user to control electromechanical systems when the user is located external from a vehicle 100. The electrical system 200 may include a control unit 202 and voice recognition system 204. In one embodiment, the control unit 202 and voice recognition system 204 are separate devices. Alternatively, the control unit 202 and voice recognition system 204 may be combined in a single device. The control unit 202 may include an RF base station 206 that operates to transmit, receive, and process RF signals 208 via antennas 210a-210n (collectively 210). Alternatively, the RF base system 206 may be a device external from the control unit 202. The control unit 202 may further include a processing unit 212 that executes software 214 that operates to communicate with the RF base system 206 and voice recognition system 204. In one embodiment, the voice recognition system 204 is integrated into the software 214. In response to the control unit 202 receiving a voice command from a user locally external to the vehicle, the control unit 202 may communicate the voice command to the voice recognition system 204, which, in response, may communicate a command notification signal 215, in either a digital or analog format, to the control unit 202, and, more specifically, the processing unit 212 to respond accordingly.

An I/O unit 216 may be in communication with the RF base station 206 and/or processing unit 212 and be configured to communicate with the antennas 210 and 130, voice recognition system 204, and other devices, including a multiplexer 218 and drivers 220. In an alternative embodiment, the control unit 202 may include the multiplexer 218 and/or drivers 220. The multiplexer 218 may be configured to communicate with microphones 222a-222n (collectively 222) and 114. As described with respect to FIG. 1, the microphones 222 and 114 may be configured such that sounds are collected external to a vehicle by the microphones 222 and 114. To minimize wiring, power, and controller inputs, the multiplexer 218 may operate to individually and selectively collect sounds from each of the antennas 210 and 130. The drivers 220 may include power circuitry that is configured to receive control signals 224, either digital or analog, and drive electromechanical systems 226a-226n (collectively 226). Although described as being electromechanical, for the purposes of this description, the electromechanical systems 226 may alternatively be exclusively electrical, wireless, optical, electro-optical, optoelectromechanical (e.g., fiber optic to electromechanical). In other words, the electromechanical systems 226 may be any system of a vehicle that the control unit 202 is configured to control in response to a user providing a voice command.

In operation, the control unit 202 may be configured to control operation of the RF and electromechanical systems of the vehicle. The processing unit 212 being in communication with the RF base station 206 and voice recognition system 204 may be configured to process or manage processing of signals being received locally external to the vehicle and drive appropriate electromechanical systems in response, as described herein.

Figures 3, 3A:
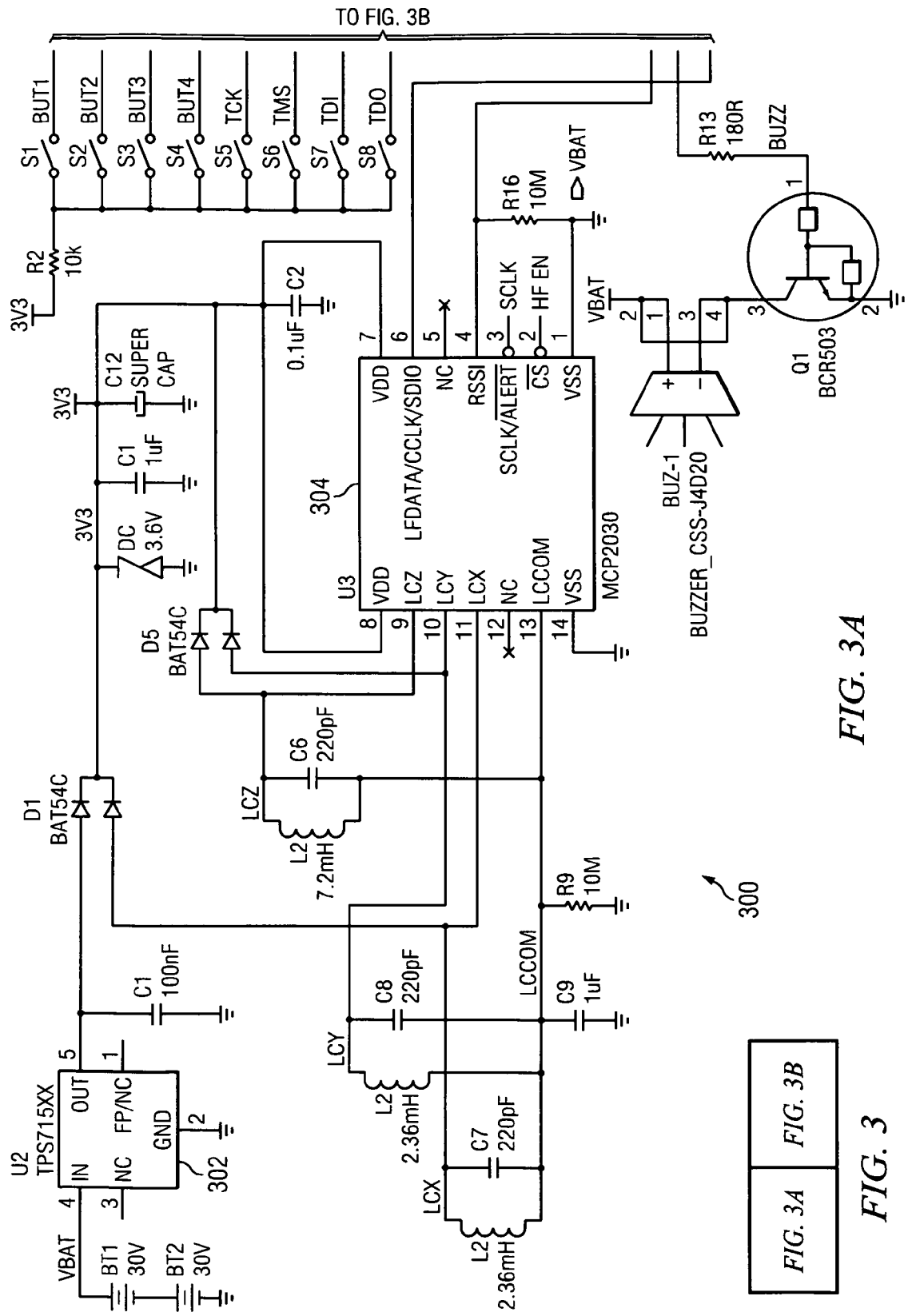
FIG. 3 is a schematic diagram of a transponder/keyfob according to an embodiment of the present invention.
Figure 3B:
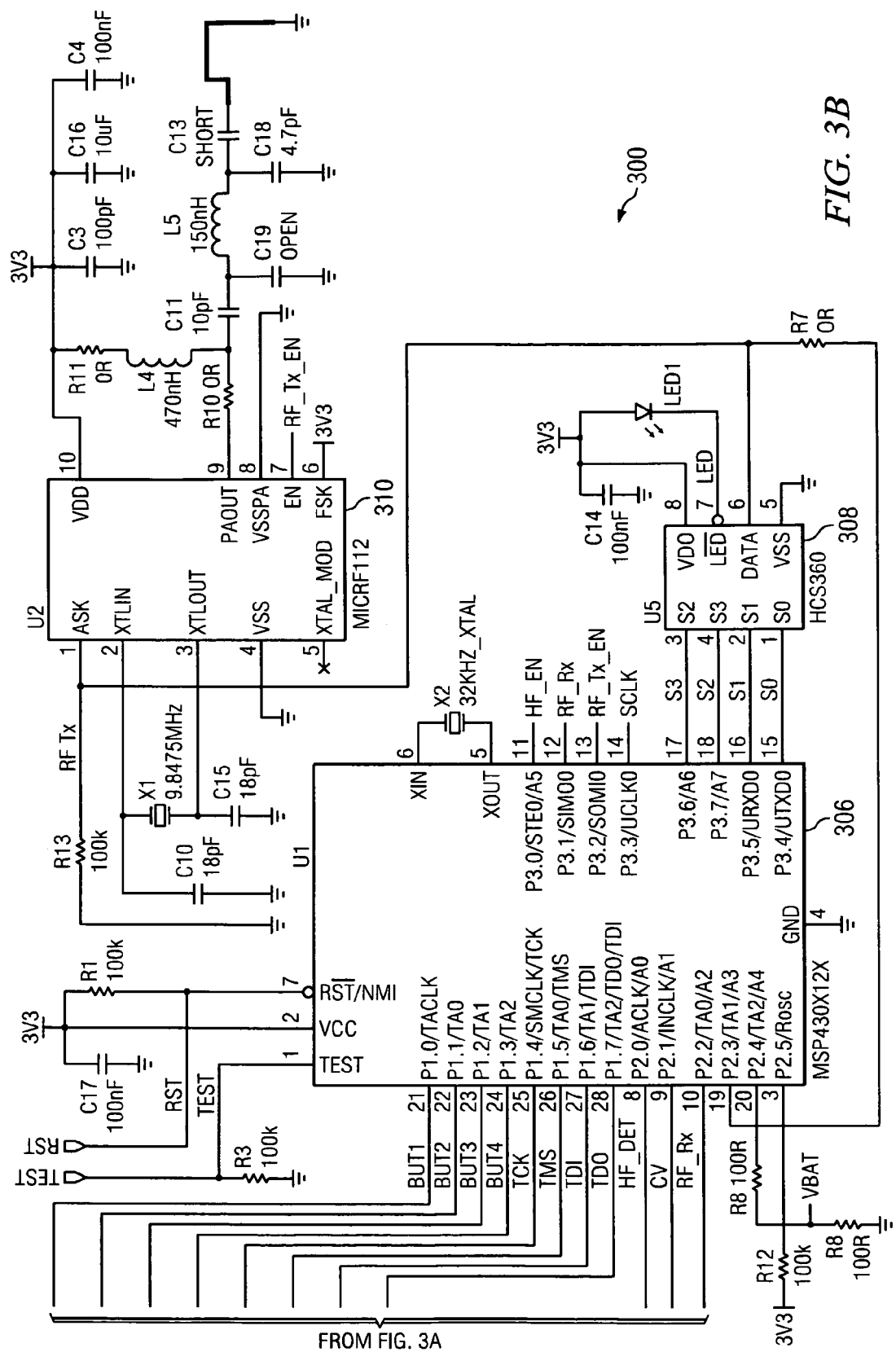
Figure 4A:
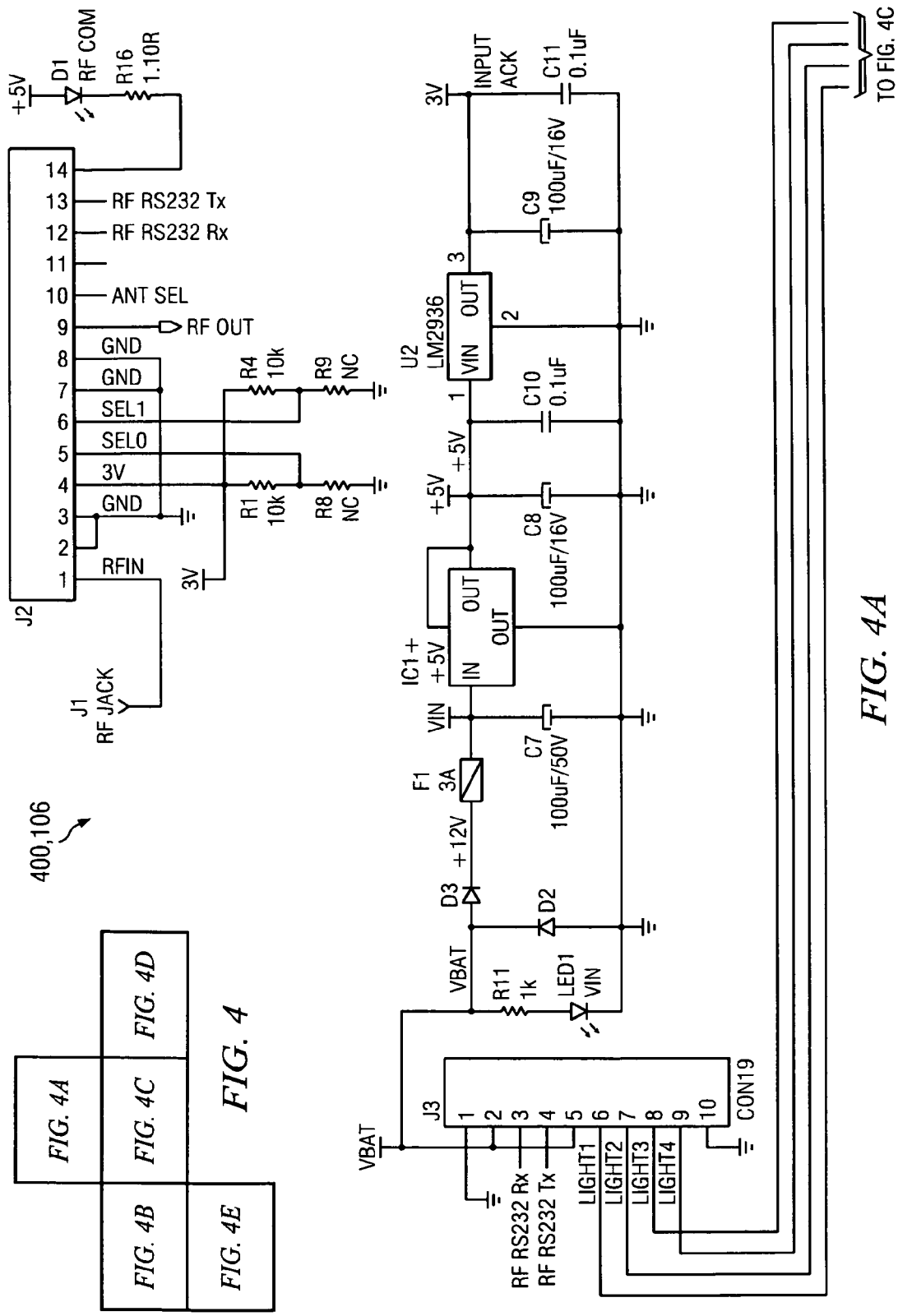
FIG. 4 is a schematic diagram of a control module according to an embodiment of the present invention.
Figure 4B:
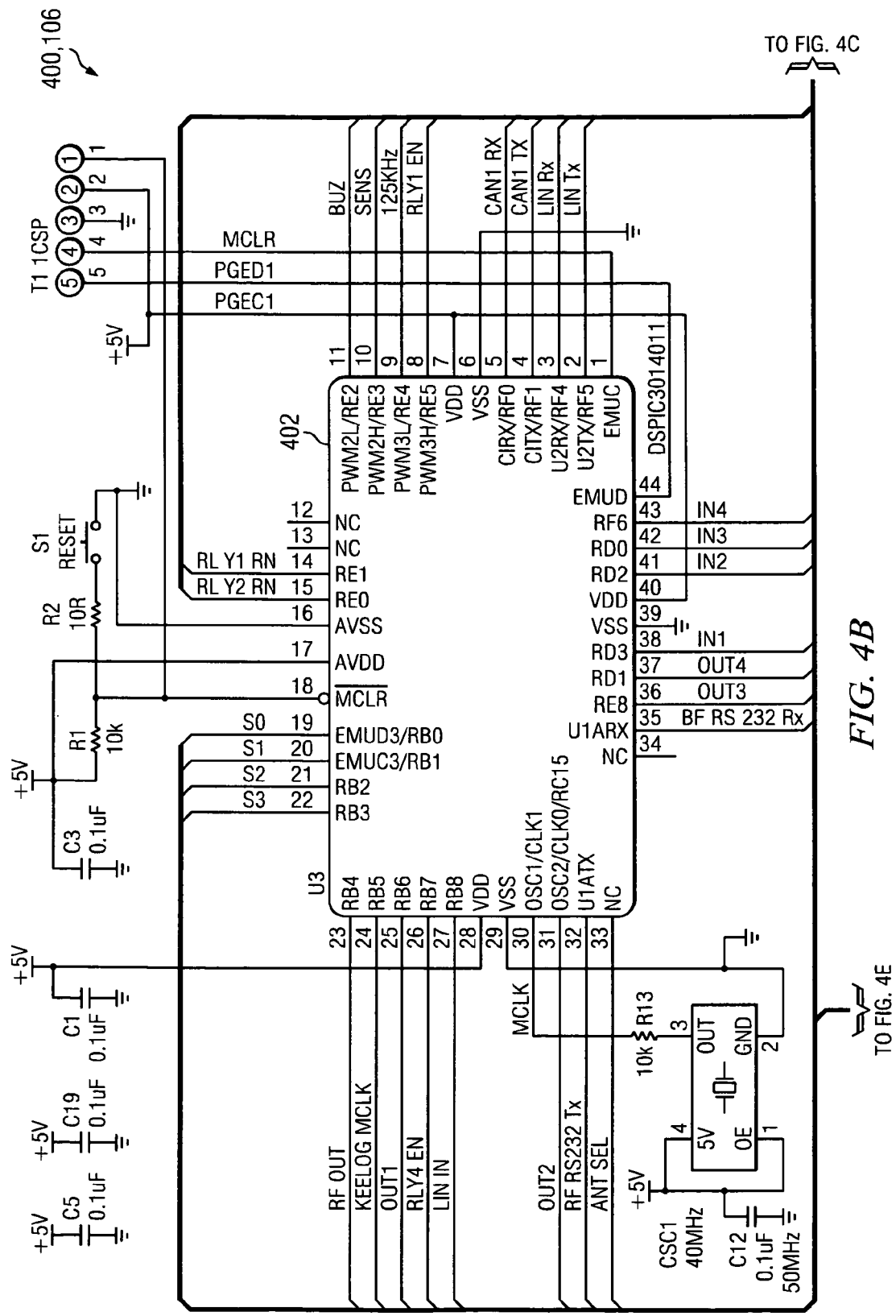
Figure 4C:
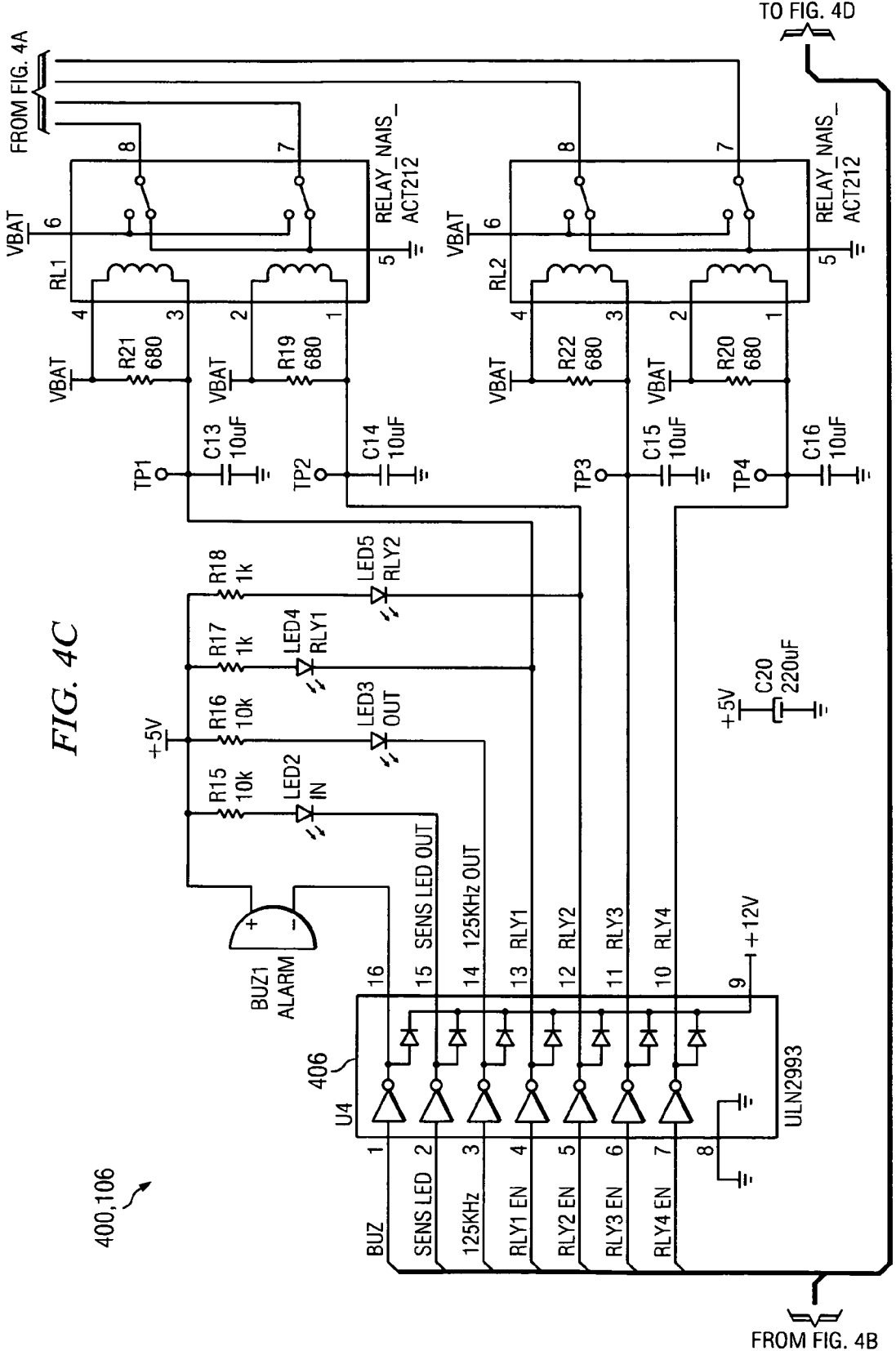
Figure 4D:
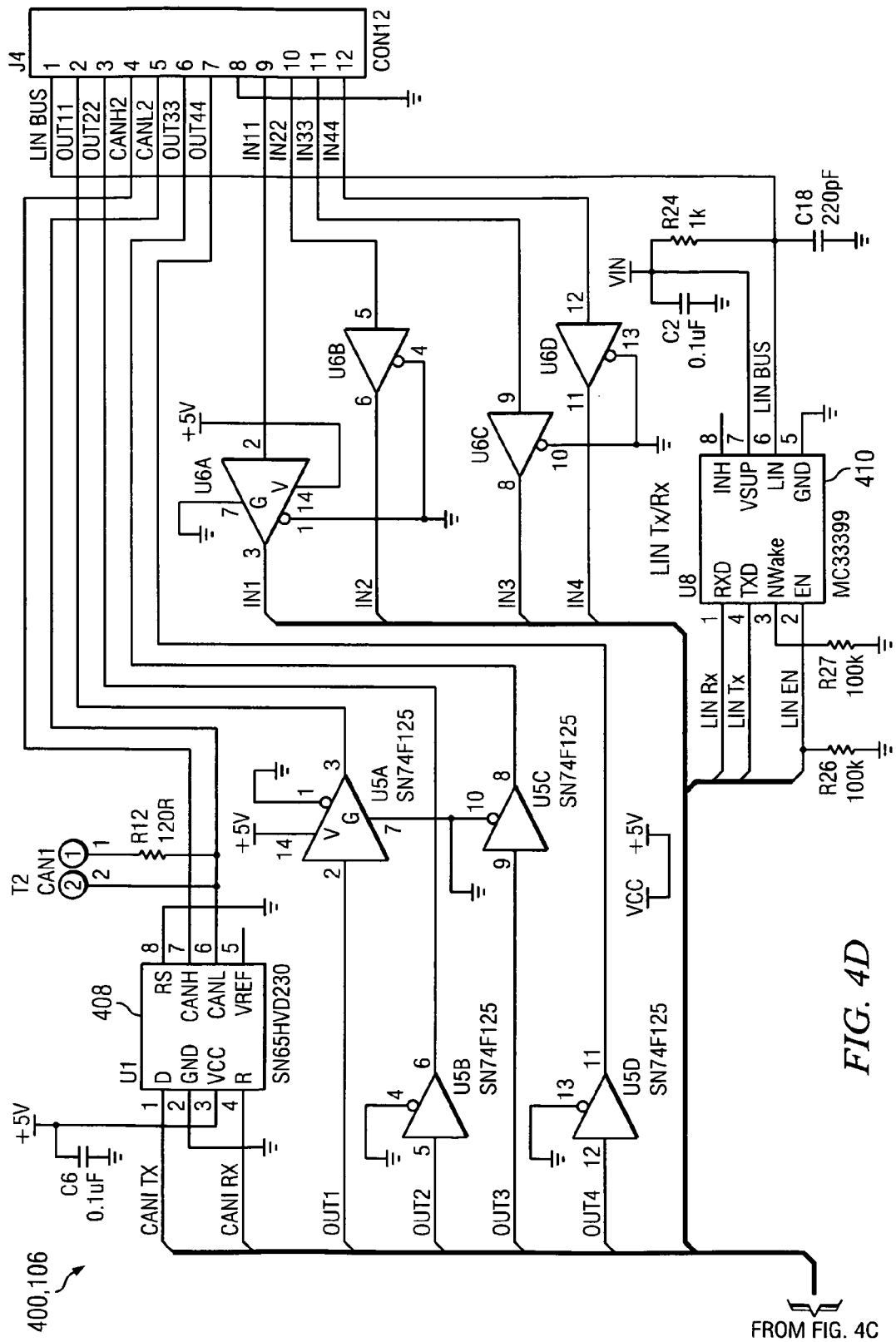
Figure 4E:
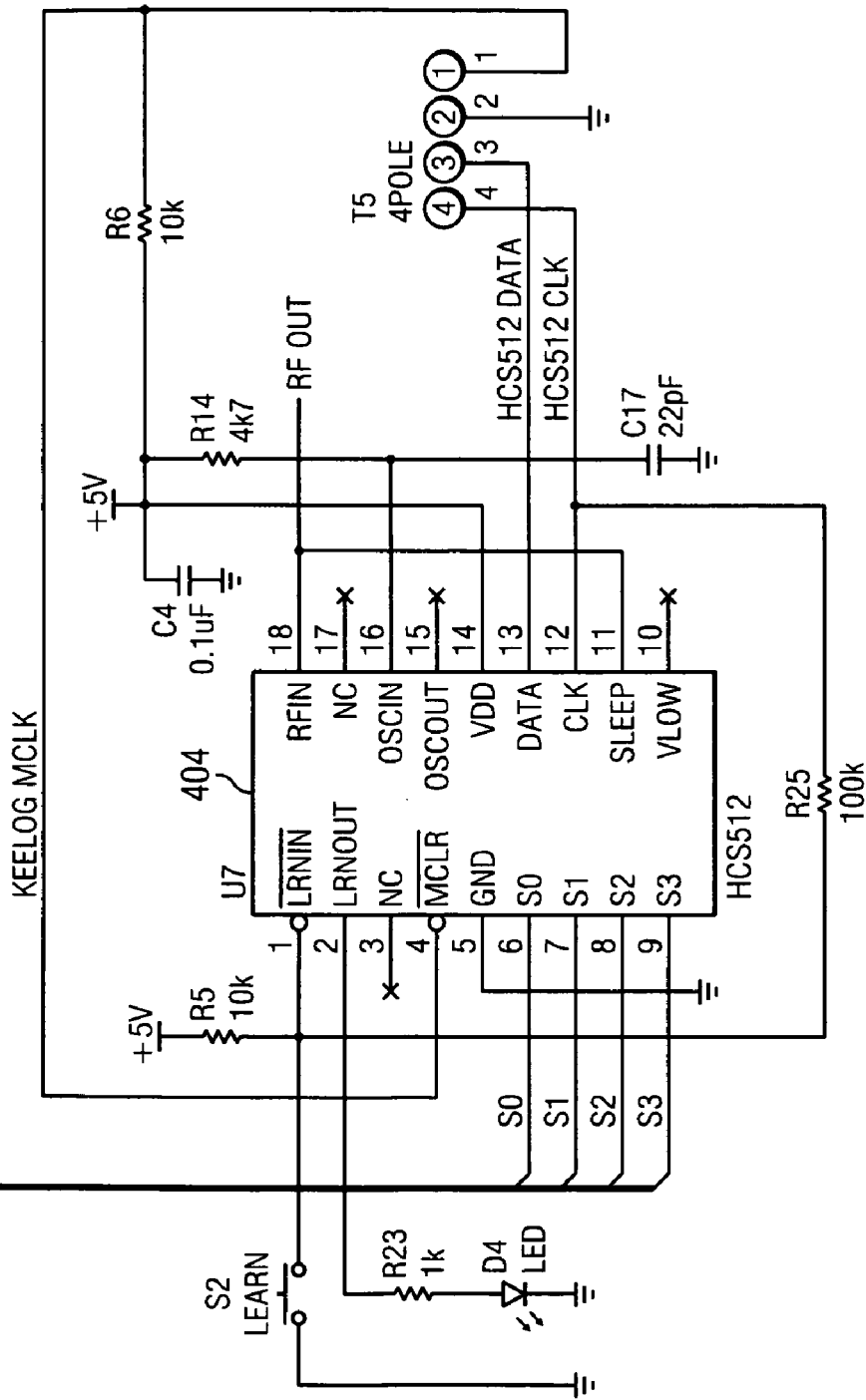

FIG. 3 illustrates a schematic of an embodiment of a transponder/keyfob 300 of the present system using flexible intelligent RF modules 104. The transponder/keyfob 300 may include a low-dropout ("LDO") voltage regulator 302 for providing low voltage operations with capacitors and the like. In addition, the transponder/keyfob 300 may include an analog front end ("AFE") device 304 for LF sensing and bidirectional communications. The AFE device 304 may include registers, LF input channels, outputs of demodulated data, carrier clock(s), and RSSI current. The transponder/keyfob 300 may further include a low power microcontroller 306, which may include registers, constant generators, central processing units ("CPUs"), oscillators for wake up functionality, I/O pins, synchronous and asynchronous protocols, analog generator, and the like. The transponder/keyfob 300 may further include a code hopping encoder 308 for remote keyless entry functionality. The code hopping encoder 308 may provide hopping code that may be generated by an encryption algorithm, for example. The transponder/keyfob 300 may further include an amplitude-shift-keying/frequency-shift-keying ("ASK/FSK") transmitter integrated circuit ("IC") for remote wireless communication in the UHF frequency band, for example. In one embodiment, these units may be wired and/or connected together as shown in the schematic. Other devices may also be part of the transponder/keyfob 300 than those described here to provide the functionality as described herein.

FIG. 4 illustrates a schematic of an embodiment of a control module 400, such as control module 106, of the system using flexible intelligent RF modules 104. The control module 400 may include a digital signal controller ("DSC") 402. In addition, the control module 400 may also include a code hopping decoder 404 for remote keyless entry functionality. The code hopping decoder 404 may be used with code hopping encoders, such as code hopping encoder 308, for use with an encryption algorithm, for example. The control module 400 may also include a high voltage, high current darlington arrays 406 for driving loads and the like as described herein. The control module control module 400 may include a controller area network ("CAN") transceiver 408 for use in CAN serial communication physical layer, for example. The control module 400 may include a LIN physical interface 410 for supporting the vehicle bus 136 in conjunction with the CAN transceiver 408, for example. In one embodiment, the control module 106 may include the devices and functionality described with respect to control module 400. The LIN 410 may work with sensors, actuators, and the like on the vehicle 100. In one embodiment, these units may be wired and/or connected together as shown in the schematic. Other devices may also be part of the control module 400 than those described here to provide the functionality as described herein.

Figure 5B:
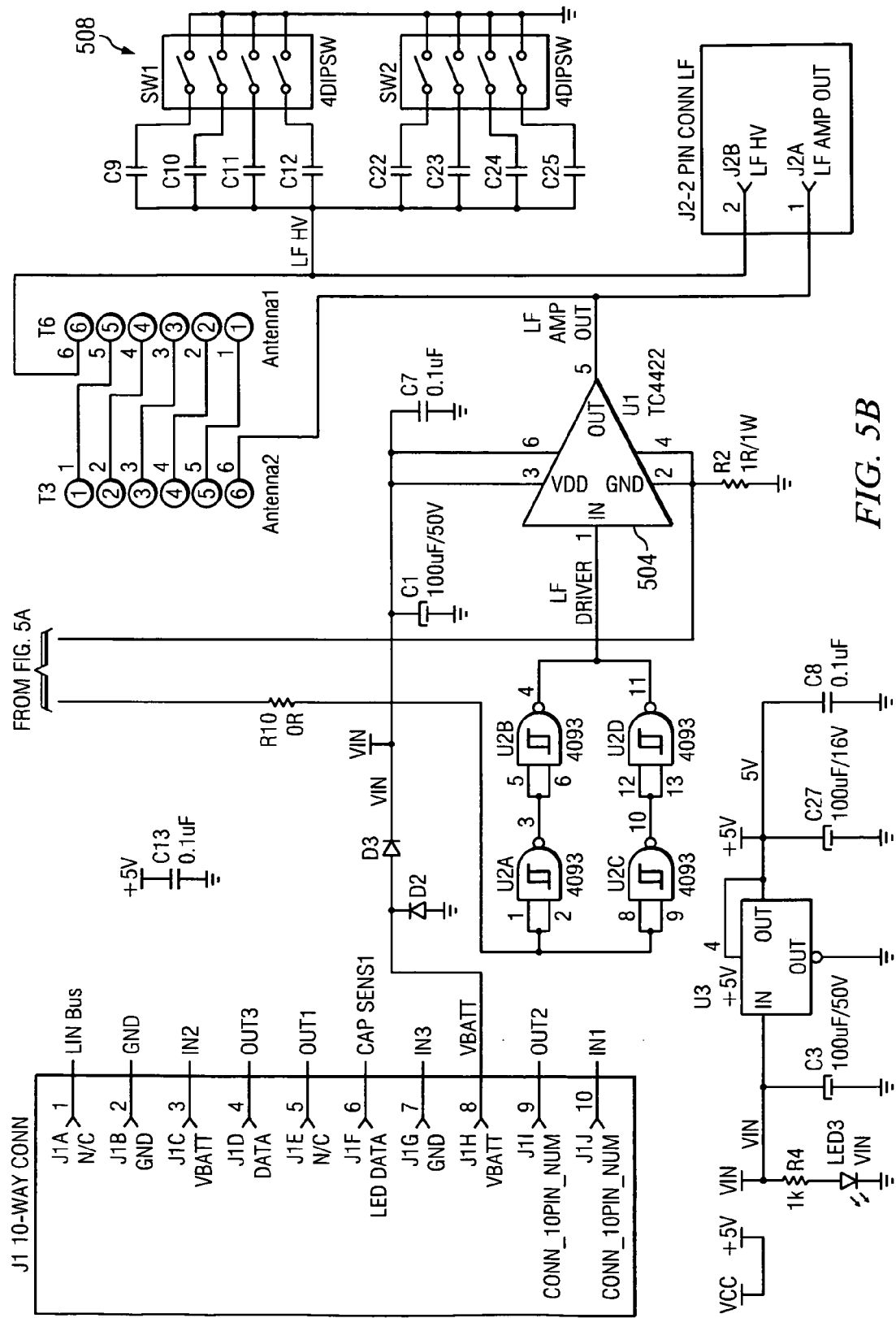
FIG. 5 is a schematic diagram of a flexible intelligent RF module with a passive low frequency RF unit and capacitive sensor according to an embodiment of the present invention.

FIG. 5 illustrates a schematic diagram of an embodiment of FIRM modules 112 of the present system using flexible intelligent RF modules 104. The FIRM modules 112 may include a mixed-signal array that may include analog and digital logic and a programmable interconnect. It may further include a CPU, flash memory program, static random access memory ("SRAM") data memory, and configurable I/Os. In addition, the FIRM modules 112 may include a high current buffer/driver 504 that is capable of driving metal-oxide semiconductor field-effect transistors ("MOSFETs") and insulated-gate bipolar transistors ("IGBTs"). The FIRM modules 112 may further include a LIN 506 as described herein. The FIRM modules 112 may include manual electric switches, such as dip switches 508 that may be used to customize the behavior of the FIRM modules 112, for example.

The FIRM modules 112 may include a passive LF antenna and a capacitive sensor to generate and manage the passive LF field emitted by the LF antennas, such as antennas 130a, 130b, and 130n on the sides of the vehicle 100. Additionally, the FIRM modules 112 may manage the capacitive sensor that may be used to detect proximity of a user to the vehicle 100.

Figure 6B:
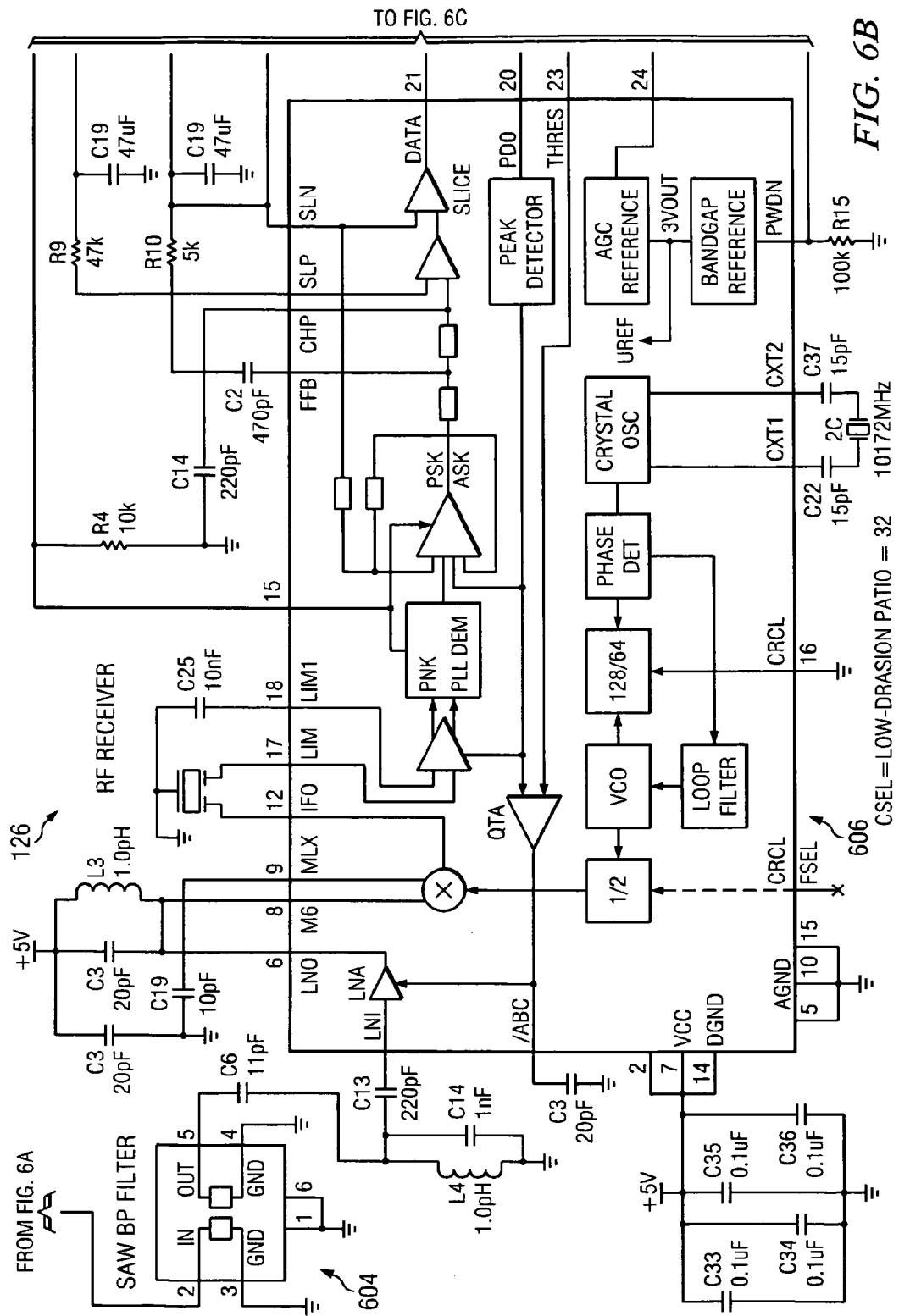
FIG. 6 is a schematic diagram of a flexible intelligent RF module with a remote keyless entry antenna according to an embodiment of the present invention.
Figure 6C:
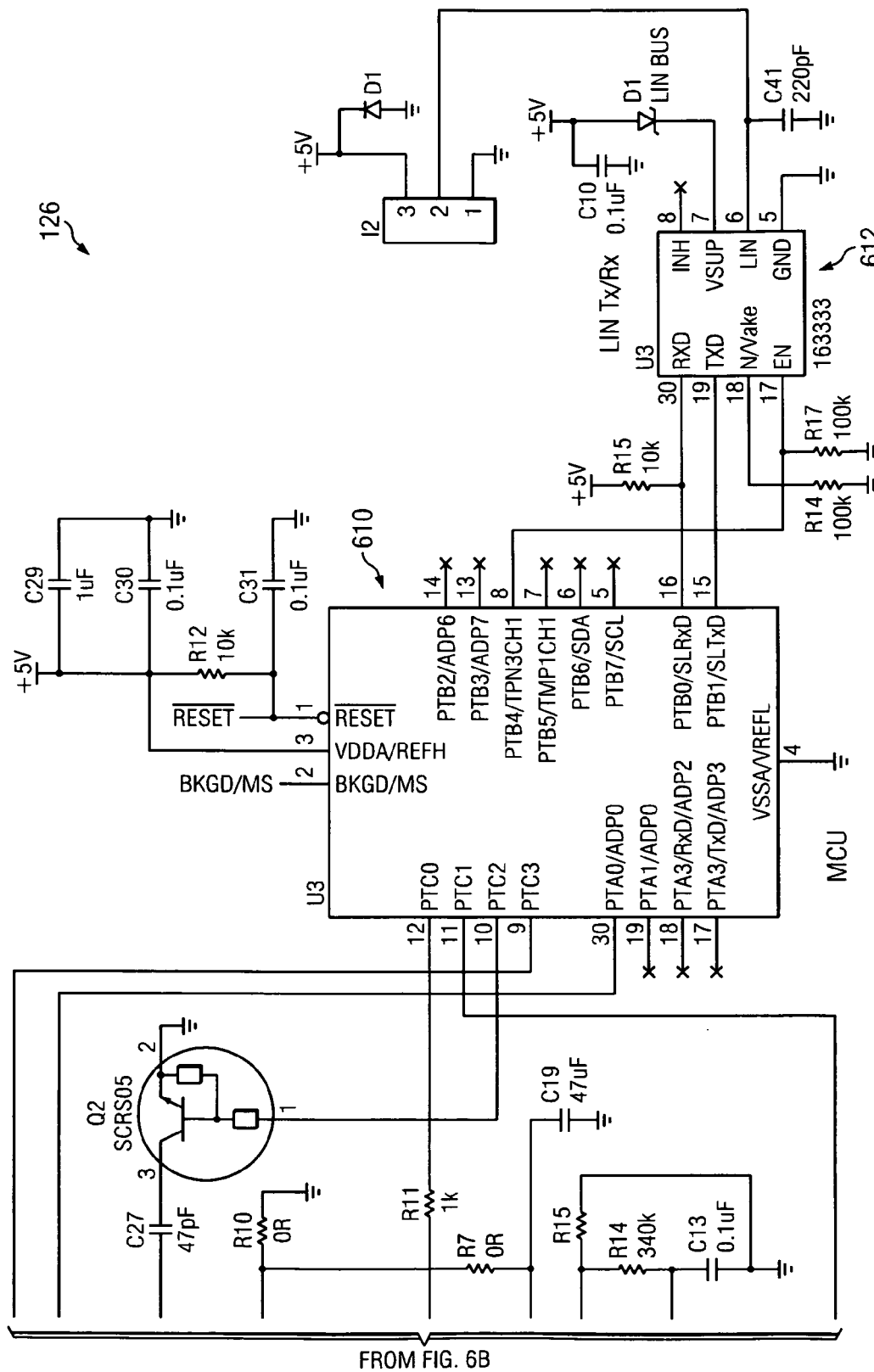

FIG. 6 illustrates a schematic diagram of an embodiment of FIRM module 126 of the present system using flexible intelligent RF modules 104. The FIRM module 126 may include antenna(s), such as antenna 130c for receiving RF signals, such as UHF RF signals at the FIRM module 126. The FIRM module 126 may further include a n-type, p-type, and n-type ("NPN") bipolar transistor/pre-amplifier. Additionally, the FIRM module 126 may include a band pass surface acoustic wave ("BP SAW") filter 604 and a RF receiver, such as an ASK/FSK receiver 606 as described herein. The FIRM module 126 may include a low-dropout ("LDO") voltage regulator 608 for providing low voltage operations with capacitors and the like. The FIRM module 126 may further include a microcontroller 610 and a LIN 612.

The FIRM module 126 may include a remote keyless entry ("RKE") antenna, such as antenna 130c for providing functionality to a transponder/keyfob 120 equipped with a RKE transponder. When a button is pressed on the transponder/keyfob 120, the appropriate message (i.e. "unlock doors") is sent from the transponder/keyfob 120 via UHF RF signals, for example, where it is received by the antenna 130c at the FIRM module 126. FIRM module 126 may receive this information and in turn transmit a message across the vehicle bus 136 instructing the other modules (FIRM or otherwise) to react accordingly.

Figures 7, 7A, 7B, 7C:
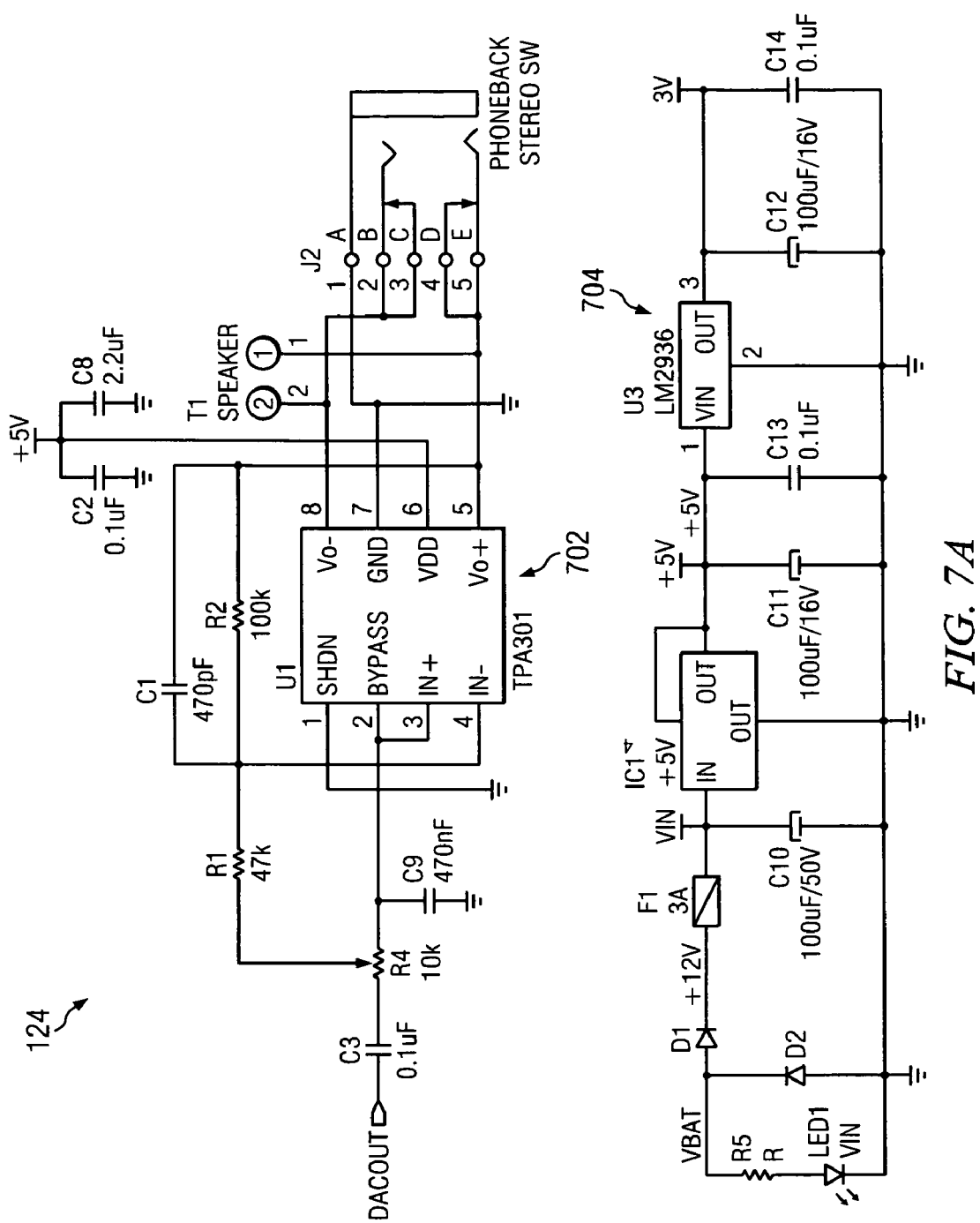
FIG. 7 is a schematic diagram of a flexible intelligent RF module with a capacitive sensor according to another embodiment of the present invention.
Figure 7B:
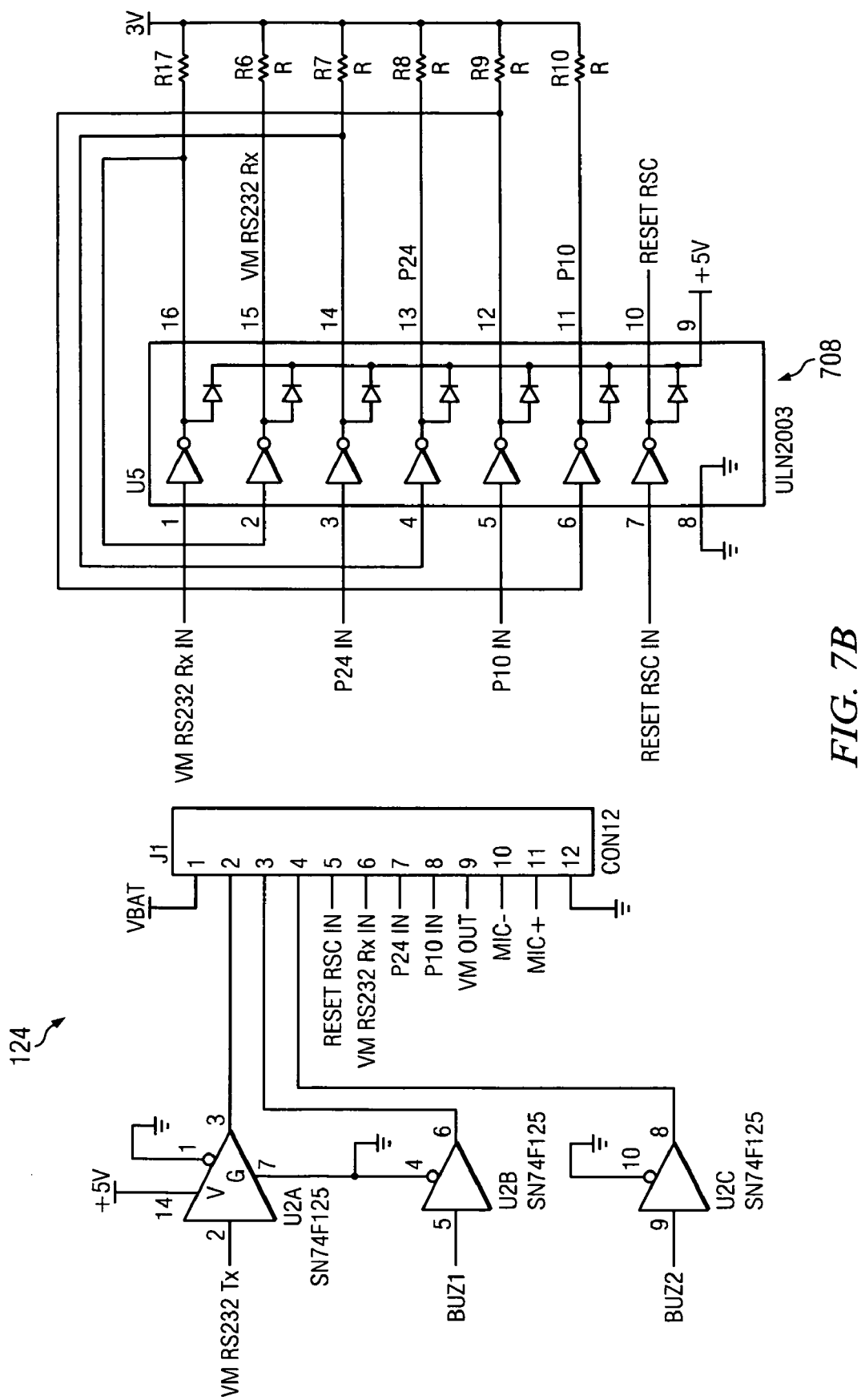
Figure 7C:
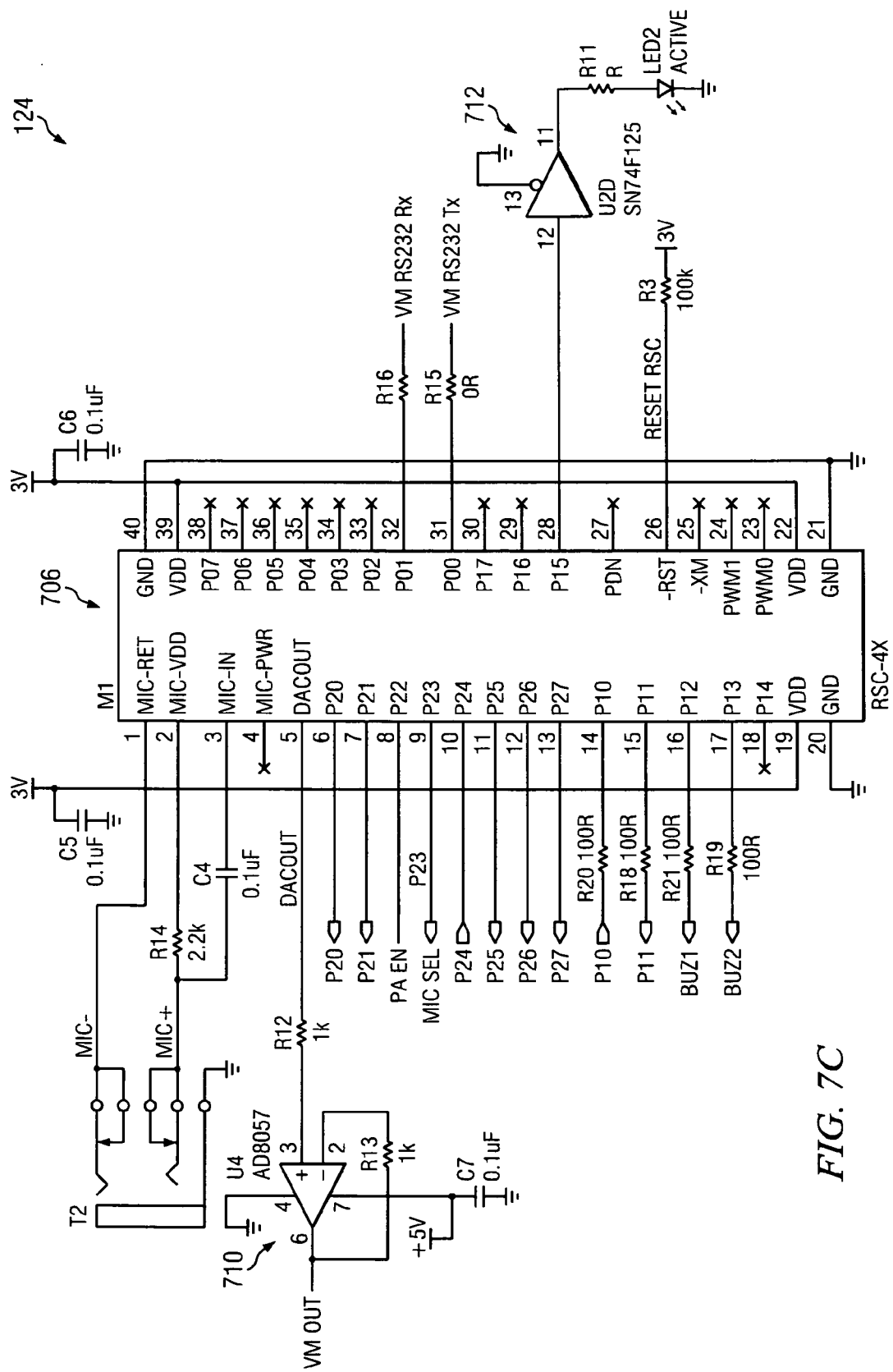

FIG. 7 illustrates a schematic diagram of an embodiment of FIRM modules 124 and/or FIRM module 128 of the system using flexible intelligent RF modules 104. These FIRM modules may include an audio power amplifier 702 for delivering power to an output device, such as a jack or speakers, and a LDO voltage regulator 704. These FIRM modules may further include a speech-recognition and synthesis microcontroller 706 for recognizing the speech of a user for activating systems and modules as described herein. These FIRM modules may also include a high voltage, high current darlington arrays 708 for driving loads and the like as described herein. These FIRM modules may further include an amplifier device, such as single and/or dual amplifier 710. The amplifier 710 may be a voltage feedback amplifier with a bandwidth and slew rate as desired for the performance and functionality as described herein. These FIRM modules may include a bus buffer gate 712, such as a quadruple bus buffer gate with 3-state output. These FIRM modules may further include a capacitive sensors 140 that is used to detect proximity of a user to the vehicle 100.

The FIRM module 128 may include a passive LF RF antenna, such as antenna 130a, and a speech/voice activation hardware and software as described herein. The FIRM module 128 may generate and manage a passive LF RF field 110a emitted by the antenna 130a anywhere on the vehicle 100. Further, the FIRM module 128 may manage the voice activation technology to control the function of power liftgates and/or decklids, for example. In addition, the FIRM modules 112, 124, 126, and 128 and control module 106 may further control sliding doors, power tailgates, power windows, remote vehicle starters, power locks, and car alarms/panic functions of a vehicle 100, for example.

In general, when a passive entry transponder, such as transponder/keyfob 120, enters one of the LF fields, such as antenna patterns 110, the corresponding FIRM module may wake up, and also may issue a command via the vehicle bus 136 communicating all of the other FIRM modules to wake up. Waking up a passive entry transponder may include the activation of the additional functionality, such as capacitive sensors or speech/voice recognition. Once active, the capacitive sensors may poll for something entering the proximity of their respective fields. Similarly, the voice activation, such as in FIRM module 128, activates and begins to poll its microphones to listen for a valid voice command. If a user enters a field or the FIRM module 128 recognizes a command, the FIRM module 128 may react and communicate the appropriate command across the vehicle bus 136.

In general, the FIRM modules may operate on a 12 volt power supplied by most vehicles 100, and in addition to or in place of vehicle bus 136, may communicate via any communications bus methods, including CAN, serial, etc. As described herein, a passive entry transponder may be included inside the transponder/keyfob 120, which may further include a key blade, and/or RKE technology. In one aspect, the FIRM modules 112, 124, 126, and 128 and control module 106 may also operate with a different power supply, such as a 5 volt power supply provided by another FIRM module, for example.

FIRM modules 112, 124, 126, and 128 and control module 106 may vary as desired to meet the requirements of a vehicle 100. Similarly, the functionality as herein described may vary from module to module. For example the FIRM modules 112, 124, 126, and 128 and control module 106 may include passive entry antennas, RKE antennas, remote start antennas, capacitive sensing, voice activation, ultrasonic sensing, for example.

Figure 8:
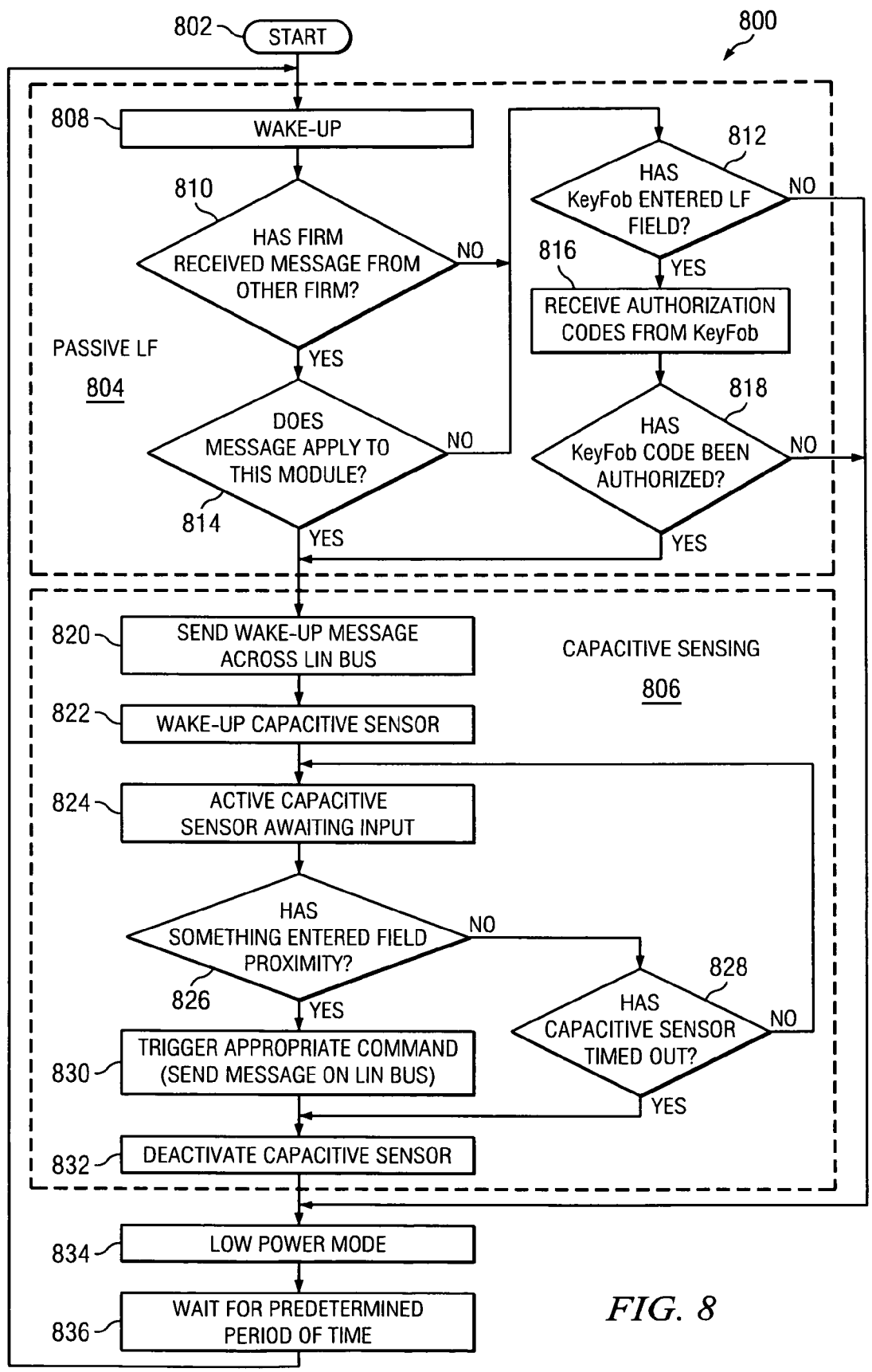
FIG. 8 is a flow diagram of an exemplary process for a passive low frequency RF unit with capacitive sensor according to an embodiment of the present invention.

FIG. 8 is a flow diagram of an embodiment of an exemplary process 800 for a user to control electromechanical systems of a vehicle utilizing the principles of the present system using flexible intelligent RF modules 104. The process 800 starts at step 802, where a passive LF system 804 may be activated in response to determining that a FIRM message or transponder/keyfob 120 has been communicated or detected.

In step 808, FIRM modules 112, 126, and 128 may be maintained in a "sleep mode" and may "wake up" and actively determine whether a passive transponder/keyfob 120 is local to the vehicle through use of one or more antenna, such as antennas 130. By using passive detection of the transponder/keyfob 120, the user is provided with a sense of convenience. Alternatively, the FIRM modules 112, 126, and 128 may receive an active communication from an active transponder/keyfob 120, but with a short range so that a user is within range of the speakers to hear his or her voice commands. As previously described, the FIRM modules 112, 126, and 128 may operate in a low power mode, where processors and other electrical devices may be set to low power or sleep modes to conserve power.

Once awake, the FIRM modules 112, 126, and 128 may determine whether they have received a message or communication from another FIRM module or control module 106 in step 810. If a message was not received, then in step 812, the FIRM modules 112, 126, and 128 may operate to determine whether a transponder/keyfob 120 is locally external to the vehicle 100. In being locally external to the vehicle, a determination is made as to whether the transponder/keyfob 120 is within an antenna pattern of an RF antenna, such as antennas 130. If the transponder/keyfob 120 is not within an antenna pattern of an RF antenna, then the process 800 continues at step 834, where any or all of the FIRM modules and control module 106 are returned to a low power mode or sleep mode. At step 836, the process 800 waits for a predetermined time period before waking up again at step 808. For example, the predetermined time period may be one second, three seconds, or any other time period.

Further to step 810, if a message has been received at a FIRM module from another FIRM module, then a determination is made at step 814 whether the message applies to the FIRM module that received it. If it does not apply to a particular FIRM module, then the process 800 continues at step 812. If at step 812 it is determined that a transponder/keyfob 120 which is synonymous to the user, is locally external to the vehicle, then the process 800 continues at step 816, where one or more authorization code(s) 122 are received from the transponder/keyfob 120. At step 818, a determination is made as to whether the authorization code(s) 122 are authorized. If not, then the process 800 continues at step 834 to return the system to a low power mode. Otherwise, the process 800 may send a wake up message across the vehicle bus 136 to the other FIRM modules, such as FIRM module 128.

The capacitive sensing system 806 starts at step 820, where a wake up message may be received by any of the FIRM modules 112 and 124 from the vehicle bus 136. In step 822, the FIRM modules 112 and 124 may "wake up," and in doing so, one or more of the FIRM modules 112 and 124 may notify the user that the capacitive sensing system 806 is active. At step 824, one or more capacitive sensors 140 of the FIRM modules 112 and/or 124 may be activated awaiting input. In step 826, the process 800 determines whether something has entered the field range 108 of the capacitive sensors 140 to cause the capacitance at the capacitive sensors 140 to change. If it is determined that nothing has entered the field range 108, then the process 800 continues to step 828 where it determines whether the capacitive sensors 140 have timed out. If it is determined that the capacitive sensors 140 have timed out, such as not receiving any response within a period of time, then in step 832, the capacitive sensors 140 may be deactivated. If the process 800 determines that the capacitive sensors 140 have not timed out, then the process 800 returns to step 824 to await input. In step 826, if something that causes a capacitance change is in the field range 108 of the capacitive sensors 140, then in step 830 the FIRM modules 112 and/or 124 may send an appropriate or desired message through the vehicle bus 136 to other FIRM modules of the present system using flexible intelligent RF modules system 104 to cause an electromechanical system to be activated, for example. The process 800 may then continues to step 832, where the capacitive sensing system 806 may be deactivated.

Figure 9:
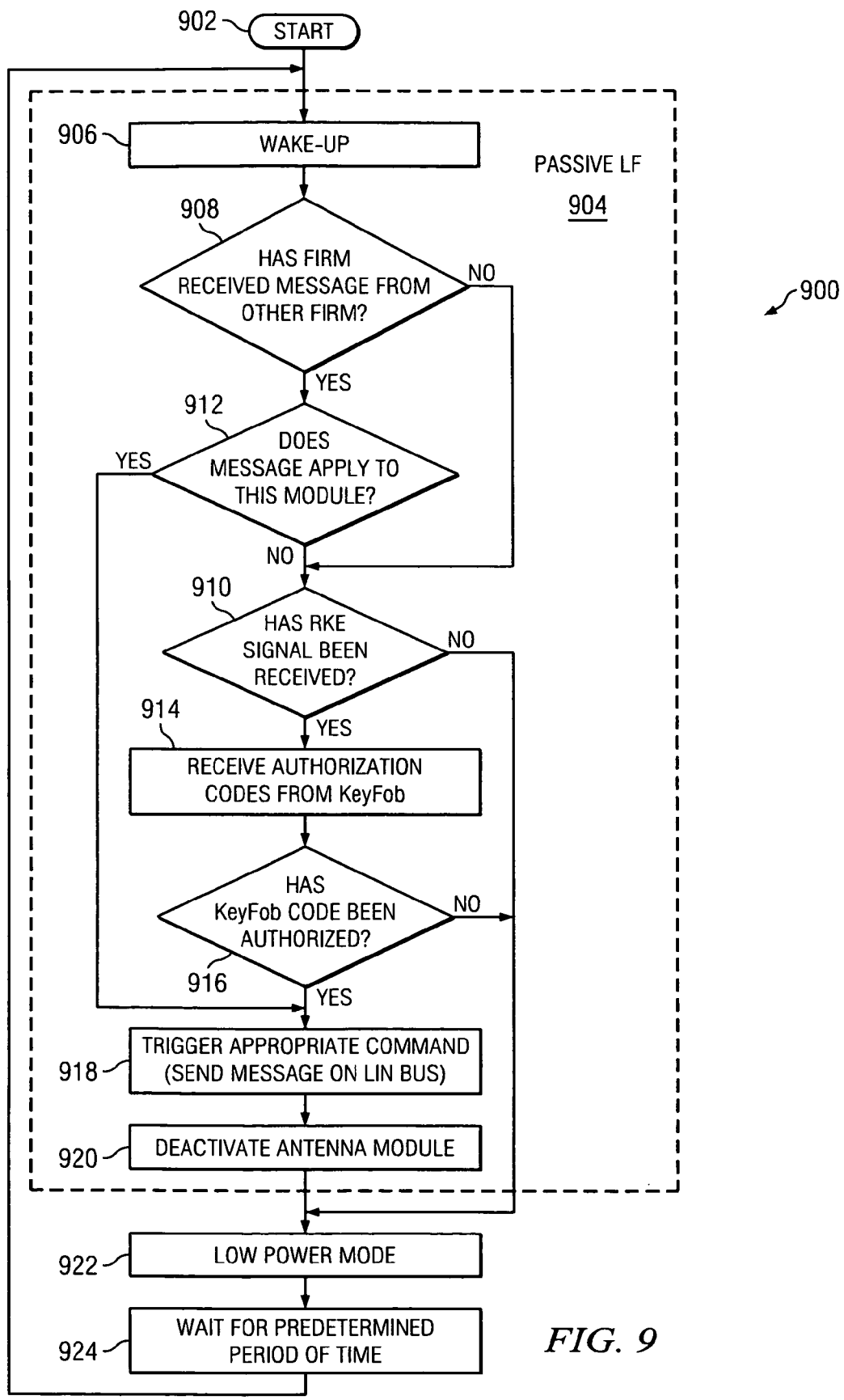
FIG. 9 is a flow diagram of an exemplary process for a remote keyless entry antenna according to an embodiment of the present invention.

FIG. 9 is a flow diagram of another embodiment of an exemplary process 900 for a user to control electromechanical systems of a vehicle utilizing the principles of the present system using flexible intelligent RF modules 104. The process 900 starts at step 902, where a passive LF system 904 may be activated in response to determining that a user is locally external to a vehicle 100. In determining that the user is located external to the vehicle 100, FIRM modules 112, 126, and 128 and/or control module 106 may emit an RF signal to cause a transponder/keyfob 120 that may be carried, in a pocket, hand, or otherwise, by a user to passively respond and be detected. To avoid undesired or unauthorized activation of the passive LF system 904, the transponder/keyfob 120 may generate and communicate one or more authorization code(s) 122 that a FIRM module 126 recognizes as being associated with the respective vehicle 100. By using passive detection of the transponder/keyfob 120, the user is provided with a sense of convenience. As an alternative, the vehicle 100 may have a keypad for receiving a code or password or a sensor to identify a user such that the user being located external to the vehicle 100 may be determined.

In step 906, FIRM modules 112, 126, and 128 and/or control module 106 may be maintained in a "sleep mode" and may "wake up" and actively determine whether a passive transponder/keyfob 120 is local to the vehicle through use of one or more antenna. By using passive detection of the transponder/keyfob 120, the user is provided with a sense of convenience. Alternatively, the FIRM modules 112, 126, and 128 and/or control module 106 may receive an active communication from an active transponder/keyfob 120, but with a short range so that a user is within range of the speakers to hear his or her voice commands. As previously described, the FIRM modules 112, 126, and 128 and/or control module 106 may operate in a low power mode, where processors and other electrical devices may be set to low power or sleep modes to conserve power.

Once awake, the FIRM modules 112, 126, and 128 and/or control module 106 may determine whether they have received a message or communication from another FIRM module or control module 106 in step 908. If a message was not received, then in step 910, the FIRM modules 112, 126, and 128 and/or control module 106 may operate to determine whether a RKE signal has been received and is locally external to the vehicle 100. If the RKE signal was not received, then the process 900 continues at step 922, where any or all of the FIRM modules and control module 106 are returned to a low power mode or sleep mode. At step 924, the process 900 waits for a predetermined time period before waking up again at step 906. For example, the predetermined time period may be one second, three seconds, or any other time period.

Further to step 908, if a message has been received at a FIRM module, then a determination is made at step 912 whether the message applies to the FIRM module that received it. If it does not apply to a particular FIRM module, then the process 900 continues at step 910. If at step 910 it is determined that a RKE signal was received, then the process 900 continues at step 914, where one or more authorization code(s) 122 are received from the transponder/keyfob 120. At step 916, a determination is made as to whether the authorization code(s) 122 are authorized. If not, then the process 900 continues at step 922 to return the system to a low power mode. Otherwise, the process 900 may send a wake up message across the vehicle bus 136 to the other FIRM modules, such as FIRM module 128. The process 900 may then continue to step 920, where the passive LF system 904 may be deactivated.

Figure 10:
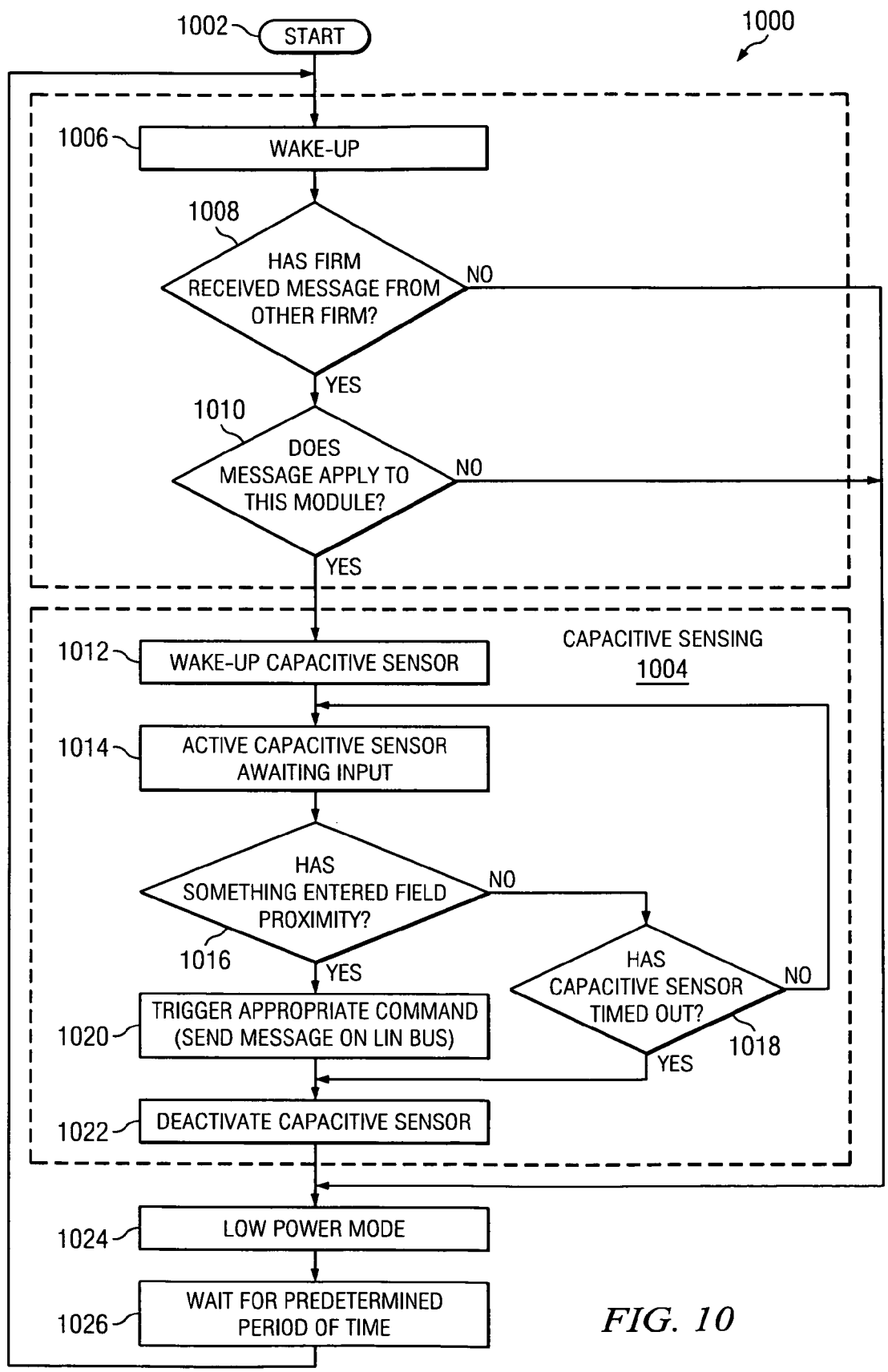
FIG. 10 is a flow diagram of an exemplary process for a capacitive sensor according to another embodiment of the present invention.

FIG. 10 is a flow diagram of another embodiment of an exemplary process 1000 for a user to control electromechanical systems of a vehicle utilizing the principles of the present system using flexible intelligent RF modules 104. The process 1000 starts at step 1002, where a capacitive sensing system 1004 may be activated in response to determining that a user is locally external to a vehicle 100. In determining that the user is located external to the vehicle 100, FIRM modules 112 and 124 and/or control module 106 may emit an RF signal to cause a transponder/keyfob 120 that may be carried, in a pocket, hand, or otherwise, by a user to passively respond and be detected. To avoid undesired or unauthorized activation of the capacitive sensing system 1004, the transponder/keyfob 120 may generate and communicate one or more authorization code(s) 122 that a FIRM module 126 recognizes as being associated with the respective vehicle 100. As an alternative, the vehicle 100 may have a keypad for receiving a code or password or a sensor to identify a user such that the user being located external to the vehicle 100 may be determined.

In step 1006, FIRM modules 112 and 124 may be maintained in a "sleep mode" and may "wake up" and actively determine whether a passive transponder/keyfob 120 is local to the vehicle through use of one or more antenna. Alternatively, the FIRM modules 112, 126, and 128 may receive an active communication from an active transponder/keyfob 120, but with a short range so that a user is within range of the speakers to hear his or her voice commands. As previously described, the FIRM modules 112, 126, and 128 may operate in a low power mode, where processors and other electrical devices may be set to low power or sleep modes to conserve power.

Once awake, the FIRM modules 112 and 124 may determine whether they have received a message or communication from another FIRM module or control module 106 in step 1008. If the FIRM modules 112 and 124 have not received a message or communication, then the process 1000 continues at step 1024, where any or all of the FIRM modules and control module 106 are returned to a low power mode or sleep mode. At step 1026, the process 1000 waits for a predetermined time period before waking up again at step 1006. For example, the predetermined time period may be one second, three seconds, or any other time period.

Further to step 1008, if a message has been received at a FIRM module, then a determination is made at step 1010 whether the message applies to the FIRM module that received it. If it does not apply to a particular FIRM module, then the process 1000 continues at step 1024. If at step 1010 it is determined that a message or communication does apply to a particular FIRM module, such as FIRM modules 112 and 124, then the process 1000 continues at step 1012, a wake up message may be received by any of the FIRM modules 112 and 124 from the vehicle bus 136. In waking up, one or more of the FIRM modules 112 and 124 may notify the user that the capacitive sensing system 1004 is active. At step 1014, one or more capacitive sensors 140 of the FIRM modules 112 and/or 124 may be activated awaiting input. In step 1016, the process 1000 determines whether something has entered the field range 108 of the capacitive sensors 140 to cause the capacitance at the capacitive sensors 140 to change. If it is determined that nothing has entered the field range 108, then the process 1000 continues to step 1018 where it determines whether the capacitive sensors 140 have timed out. If it is determined that the capacitive sensors 140 have timed out, such as not receiving any response within a period of time, then in step 1022, the capacitive sensors 140 may be deactivated. If the process 1000 determines that the capacitive sensors 140 have not timed out, then the process 1000 returns to step 1014 to await input. In step 1016, if something that causes a capacitance change is in the field range 108 of the capacitive sensors 140, then in step 1020 the FIRM modules 112 and/or 124 may send an appropriate or desired message through the vehicle bus 136 to other FIRM modules of the present system using flexible intelligent RF modules system 104 to cause an electromechanical system to be activated, for example. The process 1000 may then continue to step 1022, where the capacitive sensing system 1000 may be deactivated.

Figure 11:
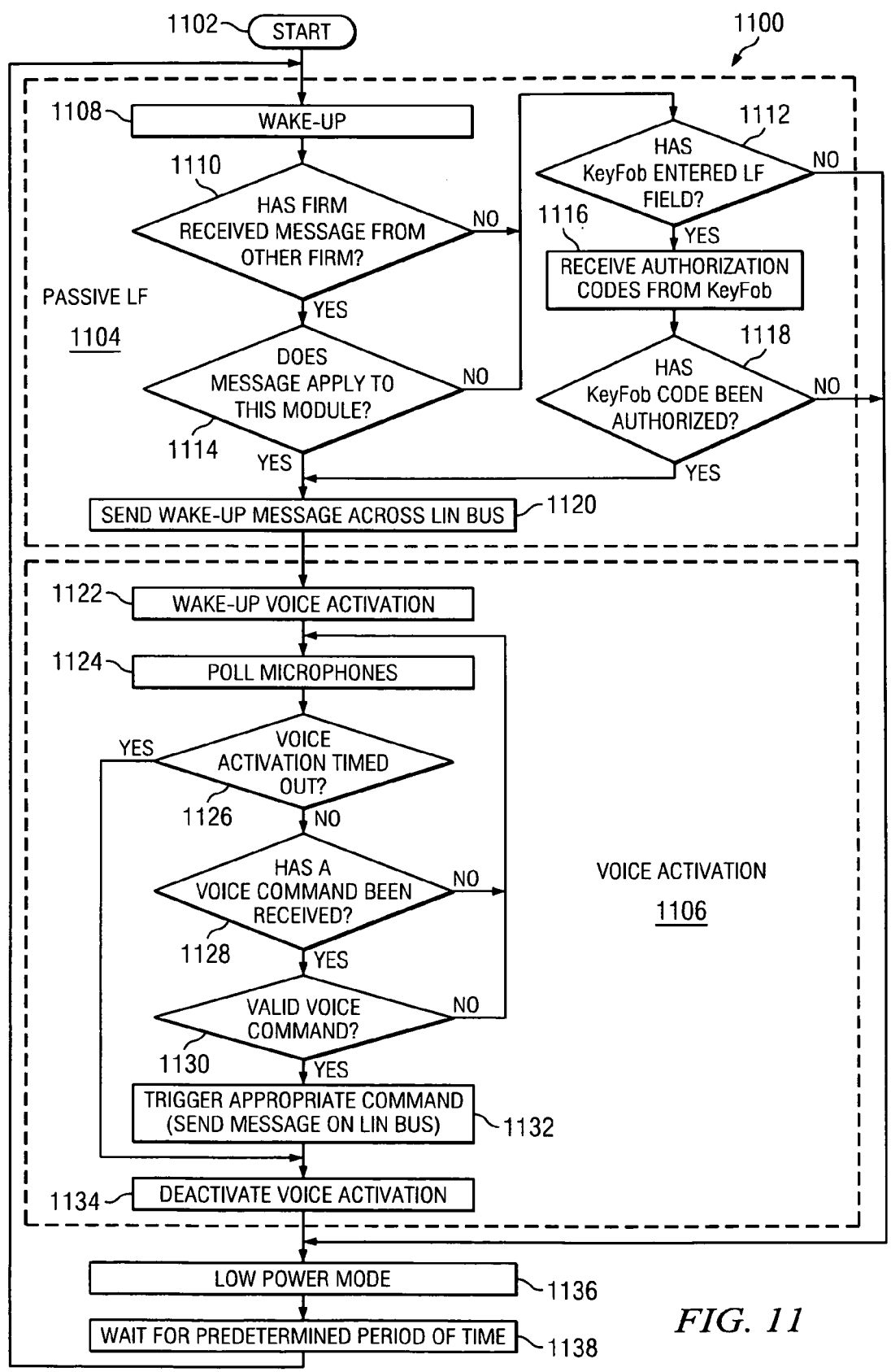
FIG. 11 is a flow diagram of an exemplary process for a passive low frequency RF unit with voice recognition according to an embodiment of the present invention.

FIG. 11 is a flow diagram of an exemplary process 1100 for a user to control electromechanical systems of a vehicle utilizing the principles of the present system using flexible intelligent RF modules 104. The process 1100 starts at step 1102, where a passive LF system 1104 may be activated in response to determining that a user is locally external to a vehicle 100. In determining that the user is located external to the vehicle 100, FIRM modules 112, 128 and/or control module 106, for example, may emit an RF signal to cause a transponder/keyfob 120 that may be carried, in a pocket, hand, or otherwise, by a user to passively respond and be detected. To avoid undesired or unauthorized activation of the passive LF system 1104, the transponder/keyfob 120 may generate and communicate one or more authorization code(s) 122 that a FIRM module 126 recognizes as being associated with the respective vehicle 100. As an alternative, the vehicle 100 may have a keypad for receiving a code or password or a sensor to identify a user such that the user being located external to the vehicle 100 may be determined.

In step 1108, FIRM modules 112, 126, and 128 may be maintained in a "sleep mode" and may "wake up" and actively determine whether they have received a message or communication from another FIRM module or control module 106 as in step 1110. If a message was not received, then in step 1112, the FIRM modules 112, 126, and 128 may operate to determine whether a transponder/keyfob 120 is locally external to the vehicle 100. In being locally external to the vehicle, a determination is made as to whether the transponder/keyfob 120 is within an antenna pattern of an RF antenna, such as antennas 130. If the transponder/keyfob 120 is not within an antenna patter of an RF antenna, then the process 1100 continues at step 1136, where any or all of the FIRM modules and control module 106 are returned to a low power mode or sleep mode. At step 1138, the process 1100 waits for a predetermined time period before waking up again at step 1108. For example, the predetermined time period may be one second, three seconds, or any other time period.

Further to step 1110, if a message has been received at a FIRM module, then a determination is made at step 1114 whether the message applies to the FIRM module that received it. If it does not apply to a particular FIRM module, then the process 1100 continues at step 1112. If at step 1112 it is determined that a transponder/keyfob 120 which is synonymous to the user, is locally external to the vehicle, then the process 1100 continues at step 1116, where one or more authorization code(s) 122 are received from the transponder/keyfob 120. At step 1118, a determination is made as to whether the authorization code(s) 122 are authorized. If not, then the process 1100 continues at step 1136 to return the system to a low power mode. Otherwise, the process 1100 may send a wake up message across the vehicle bus 136 to the other FIRM modules, such as FIRM module 128.

The voice recognition/activation system 1106 starts at step 1122, where voice activation operating on a voice recognition system may be woken up by a message and/or communication sent across the vehicle bus 136 as in step 1120, for example. In waking up, one or more visual and/or audible indicators may notify the user that the voice recognition system 1106 is active. At step 1124, one or more microphones 114 may be polled. If the antennas are aligned or otherwise associated with the microphones (e.g., rear antenna and rear microphone), then the microphone 114a and/or 114b associated with the antenna that received an RF signal from the transponder/keyfob 120 may be polled or polled first.

At step 1126, a determination may be made as to whether voice activation times out after a predetermined time period (e.g., five seconds). If the voice activation is timed out, then the process continues at step 1134, where voice activation system 1106 may be deactivated. The process 1100 continues at step 1136. If at step 1126 the voice activation is not timed Out and a voice command is determined not to be received at step 1128, then the process returns to step 1124, where the microphones 114 may continue being polled. If a voice command is received at step 1128, then a determination is made at step 1130 as to whether the voice command is a valid voice command. If not, the process 1100 may return to step 1124 to poll the microphones 114 again. If it is determined at step 1130 that a valid voice command was received, then at step 1132, an appropriate command is triggered and sent via the vehicle bus 136 to cause an electromechanical system to be activated, for example. For example, the voice command(s) and related electromechanical system operated may include "open decklid," "close decklid," "unlock doors," "lock doors," "open liftgate," "open sliding door," "open windows," "close sliding door(s)," "turn on alarm," "turn off alarm," "start vehicle," "turn off vehicle," and any other voice command that the manufacturer may desire. In one embodiment, the system may be user programmable such that the user may create voice commands to control the electromechanical systems. An audible sound, such as one or more beeps and/or a synthesized voice, may be generated in response to a voice command being correctly received. Similarly, a different sound may be generated in response to a voice command being improperly received. Further, a visual indicator may be used with or in place of an audible sound. Some exemplary visual indicators include: light emitting diodes, lamps, bulbs, and the like. The process 1100 continues at step 1134, where the voice activation is deactivated. It should be understood that the process 1100 is exemplary and that alternative or additional steps may be performed and be within the scope of the principles of the present invention.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for activating electromechanical systems of a vehicle, comprising:
   at least one first flexible intelligent radio frequency module mounted on the vehicle, configured to receive wireless communications signals;
   at least one second flexible intelligent radio frequency module mounted on the vehicle, configured to receive wireless communications signals from a transponder;
   at least one third flexible intelligent radio frequency module mounted on the vehicle, configured to transmit a signal when its capacitance is changed when an object is proximal to the at least one third flexible intelligent radio frequency module;
   at least one fourth flexible intelligent radio frequency module mounted on the vehicle, configured to receive sounds external to the vehicle;
   a control module in communication with the vehicle bus and configured to receive wireless communication signals, the control module including a digital signal controller, a LIN physical interface configured to support a vehicle bus and a CAN transceiver; and
   the vehicle bus in communication with the at least one first, second, third, and fourth flexible intelligent radio frequency modules, wherein at least one first, second, third, and fourth flexible intelligent radio frequency modules and the control module are configured to communicate with each other in order to activate the at least one fourth flexible intelligent radio frequency module from a sleep state to receive the sounds external to the vehicle.

2. The system for activating electromechanical systems of a vehicle of claim 1, further comprising:
   a transponder/keyfob configured to generate a wireless communications signal in response to receiving a detection signal communicated by the at least one second flexible intelligent radio frequency module.

3. The system for activating electromechanical systems of a vehicle of claim 2, wherein the transponder/keyfob is further configured to generate and communicate at least one authentication code.

4. The system for activating electromechanical systems of a vehicle of claim 2, wherein the at least one second flexible intelligent radio frequency module is configured to transmit a low frequency signal and, in response to said transponder/keyfob being within range of the low frequency signal, receive a response signal from the transponder/keyfob of the low frequency signal.

5. The system for activating electromechanical systems of a vehicle of claim 1, wherein said at least one second flexible intelligent radio frequency module is further configured to activate the at least one fourth flexible intelligent radio frequency module in response to determining that a wireless communications signal has been received.

6. The system for activating electromechanical systems of a vehicle of claim 1, wherein the at least one fourth flexible intelligent radio frequency module is further configured to generate and communicate a command notification signal to one or more of the at least one first, second, and third flexible intelligent radio frequency modules in response to determining a voice command, and wherein the one or more of the at least one first, second, and third flexible intelligent radio frequency modules is further configured to generate a command signal to command an electromechanical system to activate.

7. The system for activating electromechanical systems of a vehicle of claim 1, wherein the at least one first, second, and fourth flexible intelligent radio frequency modules are in communication with at least one antenna coupled to the vehicle and configured to receive wireless communications signals.

8. The system for activating electromechanical systems of a vehicle of claim 1, wherein the at least one fourth flexible intelligent radio frequency module is in communication with at least one microphone.

9. The system for activating electromechanical systems of a vehicle of claim 1, wherein the at least one fourth flexible intelligent radio frequency module further comprises a voice recognition system.

10. The system for activating electromechanical systems of a vehicle of claim 1, wherein the first and fourth flexible intelligent radio frequency modules operate with low frequency radio frequency signals between approximately 30 kHz and 300 kHz.

11. The system for activating electromechanical systems of a vehicle of claim 1, wherein the second flexible intelligent radio frequency modules operate with ultrahigh radio frequency signals between approximately 300 MHz and 3,000 MHz.

12. The system for activating electromechanical systems of a vehicle of claim 1, wherein the vehicle bus is the vehicle's local interconnect network.

13. The system for activating electromechanical systems of a vehicle of claim 1, wherein the vehicle bus comprises a communications line and at least two power lines.

14. The system for activating electromechanical systems of a vehicle of claim 1, wherein one or more of the at least one or more first, second, third, and fourth flexible intelligent radio frequency modules control one of electromechanical devices, control sliding doors, power tailgates, power windows, remote vehicle starters, power locks, car alarms, and panic functions.

15. The system for activating electromechanical systems of a vehicle of claim 1, wherein the control module controls one of electromechanical devices, control sliding doors, power tailgates, power windows, remote vehicle starters, power locks, car alarms, and panic functions.

16. The system for activating electromechanical systems of a vehicle of claim 1, wherein one or more of the at least one or more first, second, third, and fourth flexible intelligent radio frequency modules is configured to:
  receive a notification signal indicative of said at least one antenna receiving a wireless communication signal;
  receive voice signals representative of a voice command to activate an electromechanical system;
  determine voice command received;
  generate a command signal based on the voice command; and
  communicate the command signal to the electromechanical system to cause the electromechanical system to activate.

17. A vehicle, comprising:
  a vehicle body;
  at least one first flexible intelligent radio frequency module mounted on the vehicle, configured to receive wireless communications signals;
  at least one second flexible intelligent radio frequency module mounted on the vehicle, configured to receive wireless communications signals from a transponder;
  at least one third flexible intelligent radio frequency module mounted on the vehicle, configured to transmit a signal when its capacitance is changed when an object is proximal to the at least one third flexible intelligent radio frequency module;
  at least one fourth flexible intelligent radio frequency module mounted on the vehicle, configured to receive sounds external to the vehicle;
  a control module in communication with the vehicle bus and configured to receive wireless communication signals, the control module including a digital signal controller, a LIN physical interface configured to support a vehicle bus and a CAN transceiver; and
  the vehicle bus in communication with the at least one first, second, third, and fourth flexible intelligent radio frequency modules, wherein at least one first, second, third, and fourth flexible intelligent radio frequency modules and the control module are configured to communicate with each other in order to activate the at least one fourth flexible intelligent radio frequency module from a sleep state to receive the sounds external to the vehicle.

18. The vehicle of claim 17, further comprising:
  a transponder/keyfob configured to generate a wireless communications signal in response to receiving a detection signal communicated by the at least one second flexible intelligent radio frequency module.

19. The vehicle of claim 18, wherein the transponder/keyfob is further configured to generate and communicate at least one authentication code.

20. The vehicle of claim 18, wherein the at least one second flexible intelligent radio frequency module is configured to transmit a low frequency signal and, in response to said transponder/keyfob being within range of the low frequency signal, receive a response signal from the transponder/keyfob of the low frequency signal.

21. The vehicle of claim 17, wherein said at least one second flexible intelligent radio frequency module is further configured to activate the at least one fourth flexible intelligent radio frequency module in response to determining that a wireless communications signal has been received.

22. The vehicle of claim 17, wherein the at least one fourth flexible intelligent radio frequency module is further configured to generate and communicate a command notification signal to one or more of the at least one first, second, and third flexible intelligent radio frequency modules in response to determining a voice command, and wherein the one or more of the at least one first, second, and third flexible intelligent radio frequency modules is further configured to generate a command signal to command an electromechanical system to activate.

23. The vehicle of claim 17, wherein the at least one first, second, and fourth flexible intelligent radio frequency modules are in communication with at least one antenna coupled to the vehicle and configured to receive wireless communications signals.

24. The vehicle of claim 17, wherein the at least one fourth flexible intelligent radio frequency module is in communication with at least one microphone.

25. The vehicle of claim 17, wherein the at least one fourth flexible intelligent radio frequency module further comprises a voice recognition system.

26. The vehicle of claim 17, wherein the first and fourth flexible intelligent radio frequency modules operate with low frequency radio frequency signals between approximately 30 kHz and 300 kHz.

27. The vehicle of claim 17, wherein the second flexible intelligent radio frequency modules operate with ultrahigh radio frequency signals between approximately 300 MHz and 3,000 MHz.

28. The vehicle of claim 17, wherein the vehicle bus is the vehicle's local interconnect network.

29. The vehicle of claim 17, wherein the vehicle bus comprises a communications line and at least two power lines.

30. The vehicle of claim 17, wherein one or more of the at least one or more first, second, third, and fourth flexible intelligent radio frequency modules control one of electromechanical devices, control sliding doors, power tailgates, power windows, remote vehicle starters, power locks, car alarms, and panic functions.

31. The vehicle of claim 17, wherein the control module controls one of electromechanical devices, control sliding doors, power tailgates, power windows, remote vehicle starters, power locks, car alarms, and panic functions.

32. The vehicle of claim 17, wherein one or more of the at least one or more first, second, third, and fourth flexible intelligent radio frequency modules is configured to:
- receive a notification signal indicative of said at least one antenna receiving a wireless communication signal;
- receive voice signals representative of a voice command to activate an electromechanical system;
- determine voice command received;
- generate a command signal based on the voice command; and
- communicate the command signal to the electromechanical system to cause the electromechanical system to activate.

* * * * *